(12) United States Patent
Arai et al.

(10) Patent No.: US 6,495,293 B1
(45) Date of Patent: Dec. 17, 2002

(54) NON-AQUEOUS ELECTROLYTE COMPRISING A FLUORINATED SOLVENT

(75) Inventors: Juichi Arai, Katsura-mura (JP); Hideaki Katayama, Ibaraki (JP); Mitsuru Kobayashi, Hitachiota (JP)

(73) Assignee: Hitachi, Ltd., Tokyo (JP)

( * ) Notice: Subject to any disclaimer, the term of this patent is extended or adjusted under 35 U.S.C. 154(b) by 52 days.

(21) Appl. No.: 09/645,428

(22) Filed: Aug. 24, 2000

(30) Foreign Application Priority Data

Sep. 20, 1999 (JP) .......................................... 11-265002

(51) Int. Cl.[7] .............................................. H01M 6/18
(52) U.S. Cl. ...................... 429/307; 429/316; 429/322; 429/341; 429/231.95; 429/224
(58) Field of Search ................................ 429/307, 322, 429/231.95, 224, 231.1, 324, 341, 316

(56) References Cited

U.S. PATENT DOCUMENTS 4,963,161 A * 10/1990 Chi et al. .................. 29/623.5
6,210,835 B1 * 4/2001 Arai ........................... 429/199
6,291,106 B1 * 9/2001 Daido et al. ............. 429/231.8

FOREIGN PATENT DOCUMENTS

JP 837024 A * 2/1996
JP 1012272 A * 1/1998

\* cited by examiner

Primary Examiner—Laura Weiner
(74) Attorney, Agent, or Firm—Antonelli, Terry, Stout & Kraus, LLP

(57) ABSTRACT

An organic electrolyte and polymer is provided wherein diffusivity of mobile ions is enhanced; and a lithium primary battery, lithium secondary battery, polymer secondary battery, and electrochemical capacitor, is provided which have increased capacities at a low temperature.

A non-aqueous electrolyte and polymer electrolyte, wherein a fluorinated solvent having a fluorinated alkyl group, of which the terminal end structure is an unsymmetrical structure, is mixed with the electrolyte, is provided for use in various applications.

12 Claims, 2 Drawing Sheets

NON-AQUEOUS ELECTROLYTE COMPRISING A FLUORINATED SOLVENT

BACKGROUND OF THE INVENTION

The present invention relates to a non-aqueous electrolyte, a solid electrolyte, lithium secondary batteries, and electrochemical capacitors; and, more particularly, the invention relates to an improvement in the diffusivity of electrolyte and a solid electrolyte, to the improvement in load performance of batteries and polymer secondary batteries at a low temperature, and to improvement in the charge-discharge performance of electrochemical capacitors.

A non-aqueous electrolyte using an organic solvent has a high anti-oxidant performance in comparison with an aqueous electrolyte; and, a non-aqueous electrolyte is widely used for lithium primary batteries and lithium secondary batteries, which are driven with a voltage higher than the oxidation voltage of water, as well as for electrochemical capacitors exceeding the 2V class, and the like. Generally, for a non-aqueous electrolyte, organic solvents of a cyclic and linear chain carbonate ester, such as ethylene carbonate, propylene carbonate, butylene carbonate, dimethyl carbonate, ethyl methyl carbonate, diethyl carbonate, and the like; a cyclic and linear chain ether, such as dimethoxy methane, 1,2-dimethoxy ethane, digryme, trigryme, 1,3-dioxolane, tetrahydrofuran, 2-methyl tetrahydrofuran, and the like; γ-butylolactom, sulfolane, methyl propionate, ethyl propionate, and others are used. However, these solvents have a larger molecular weight in comparison with a water molecule, and so disadvantages result due to solubility and dissociation, because the number of molecules of the solvent is small in an equivalent salt concentration. Furthermore, the diffusivity of ions is decreased, because the volume of solvation to ions becomes larger than water, and a decreasing capacity performance of batteries and capacitors is generated at a low temperature or high rate load with the non-aqueous electrolyte.

A solid electrolyte, which is formed by impregnating a non-aqueous electrolyte into a foamed polymer material, such as polyvinylidene fluoride (hereinafter, called as PVDF) and the like, and a gel group solid polymer electrolyte, which uses a gel formed by the steps of melting a polymer such as polyethylene oxide (hereinafter, called as PEO) with a non-aqueous electrolyte at a high temperature and cooling the mixture to room temperature as an electrolyte, makes it possible to make the outer container of the batteries thin and light weight, because the electrolyte creates no problems concerning liquid. leakage in the batteries, nor the necessity to use a strong battery can. Therefore, currently, polymer batteries using these electrolytes have been developed and have come to be mounted in portable telephones and the like. These polymer electrolytes have an even lower diffusivity of ions in comparison with liquid non-aqueous electrolytes, and their operation performance at a low temperature and high rate load is further decreased.

A non-aqueous electrolyte has a low electric conductivity in comparison with an aqueous electrolyte and is inferior to the aqueous electrolyte in low temperature characteristics and load characteristics. In order to solve such problems, U.S. Pat. No. 5,795,677 discloses a non-aqueous electrolyte which includes a fluorinated ether having a structure in which a fluorinated alkyl chain and ether oxygen are connected via a —CH$_2$— structure. In accordance with the above prior art, the low temperature characteristics and load characteristics are certainly improved by mixing the fluorinated solvent.

However, in the case of the above prior art, wherein the fluorinated alkyl chain and ether oxygen are connected via a —CH$_2$— structure, the decrease in the electron density on the ether oxygen is small, and an interaction between the fluorinated ether and lithium ions is produced. Therefore, the fluorinated ether is solvated with lithium ions, and an advantage in which the improvement in diffusivity of lithium ions produced by mixing the fluorinated solvent can not be achieved sufficiently.

SUMMARY OF THE INVENTION

One of the objects of the present invention is to provide a non-aqueous electrolyte having a high diffusivity; a polymer electrolyte having a high diffusivity; and non-aqueous electrolyte group batteries, electrochemical capacitors, and polymer secondary batteries, the performance at a low temperature of which is improved by using the above electrolyte.

The above object can be achieved by mixing a fluorinated solvent indicated by a chemical formula 1 into the non-aqueous electrolyte. If lithium salt is used as a supporting electrolyte of the non-aqueous electrolyte, the electrolyte can be used as the electrolyte for lithium primary battery and a lithium secondary battery, and the diffusivity of the lithium ions can be improved. Furthermore, the performance of these batteries at a low temperature can be improved by using such an electrolyte. If quaternary onium salt is used as a supporting electrolyte, the electrolyte can be used as the electrolyte for electrochemical capacitors, and the performance of these capacitors at a low temperature can be improved by using the electrolyte. Furthermore, the diffusivity of lithium ions in a polymer electrolyte can be improved by mixing the fluorinated solvent expressed by the chemical formula 1 into a polymer electrolyte composed of a mixture of a polymer compound and a non-aqueous electrolyte, and the performance of the polymer secondary batteries at a low temperature can be improved by using the electrolyte.

The fluorinated solvent to be mixed into an electrolyte is ethyl ether of fluorinated alkyl carboxylic acid, the terminal end of the fluorinated alkyl of which is a difluoromethyl group, expressed by the following chemical formula 5, which has a structure in which the fluorinated alkyl group is directly combined with functional group:

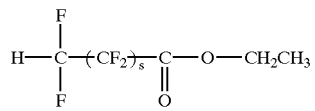

(wherein, s indicates any one of integers of 0, 3, 5, 7, and 9), or fluorinated alkyl iodide, the terminal end of the fluorinated alkyl of which is a difluoromethyl group, expressed by the following chemical formula 6:

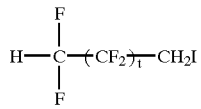

(wherein, t indicates any one of integers of 1, 3, and 5), or fluorinated solvent, in which both terminal ends of its molecule are isoheptafluoropropyl groups, expressed by the following chemical formula 7:

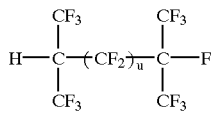

(wherein, u indicates an integer of 4 or 8), or fluorinated alkyl acrylate compound, the terminal end of the fluorinated alkyl of which is a difluoromethyl group, expressed by the following chemical formula 8:

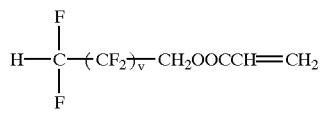

(wherein, v indicates any one of integers of 4, 6, 8, and 10), or fluorinated alkyl methacrylate compound, the terminal end of the fluorinated alkyl of which is a difluoromethyl group, expressed by the following chemical formula 9:

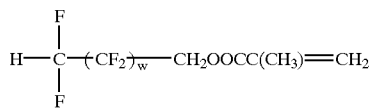

(wherein, w indicates any one of integers of 4, 6, 8, and 10), or a compound expressed by the following chemical formula 10:

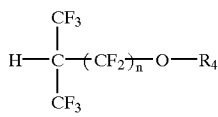

(wherein, n indicates an integer in the range of 2–6, and $R_4$ indicates any one of methyl group, ethyl group, and propyl group), for instance, any one of ether of $H(CF_2)_2OCH_3$, $H(CF_2)_2OCH_2CH_3$, $H(CF_2)_2OCH_2CF_3$, and the like, or ether of $CF_3CHFCF_2OCH_3$, $CF_3CHFCF_2OCH_2CH_3$, or isoperfluoroalkyl alkyl ether expressed by the chemical formula 4, that is, 2-trifluoromethyl hexafluoropropyl methyl ether, 2-trifluoromethyl hexafluoropropyl ethyl ether, 2-trifluoromethyl hexafluoropropyl propyl ether, 3-trifluoro octafluorobutyl methyl ether, 3-trifluoro octafluorobutyl ethyl ether, 3-trifluoro octafluorobutyl propyl ether, 4-trifluorodecafluoropenthyl methyl ether, 4-trifluorodecafluoropenthyl ethyl ether, 4-trifluorodecafluoropenthyl propyl ether, 5-trifluorododecafluorohexyl methyl ether, 5-trifluorododecafluorohexyl ethyl ether, 5-trifluorododecafluorohexyl propyl ether, 6-trifluorotetradecafluoroheptyl methyl ether, 6-trifluorotetradecafluoroheptyl ethyl ether, 6-trifluorotetradecafluoroheptyl propyl ether, 7-trifluorohexadecafluorooctyl methyl ether, 7-trifluorohexadecafluorooctyl ethyl ether, and 7-trifluorohexadecafluorohexyl octyl ether can be used. Furthermore, a mixture of any one of the above compounds with perfluoroalkyl alkyl ether having a linear chain structure can be used.

The solvent for composing the electrolyte other than the fluorinated solvent are a cyclic and linear chain carbonate ester, such as ethylene carbonate, propylene carbonate, butylene carbonate, chloroethylene carbonate, trifluoromethyl propylene carbonate, vinylene carbonate, dimethyl vinylene carbonate, dimethyl carbonate, ethyl methyl carbonate, diethyl carbonate, and the like; cyclic and linear chain ether such as dimethoxy methane, 1, 2-dimethoxy ethane, digryme, trigryme, 1, 3-dioxolane, tetrahydrofuran, 2-methyl tetrahydrofuran, and the like; γ-butylolactom, sulfolane, methyl propionate, ethyl propionate, ethylene sulfate, dimethyl sulfoxide, ethyl methyl sulfoxide, diethyl sulfoxide, methyl propyl sulfoxide, ethyl propyl sulfoxide, propane sulton, and others, which can be used alone or as a mixture.

As the lithium salt for a supporting electrolyte of the electrolyte for lithium battery, $LiPF_6$, $LiBF_4$, $LiClF_4$, $LiSO_3CF_3$, $LiN(SO_2CF_3)$, $LiN(SO_2CF_2CF_3)$, $LiC(SO_2CF_2CF_3)_3$, $LiC(SO_2CF_3)_3$, $LiI$, $LiCl$, $LiF$, $LiPF_5(SO_2CF_3)$, $LiPF_4(SO_2CF_3)_2$, and the like can be used.

As the supporting electrolyte for an electrochemical capacitor, quaternary onium salts such as $(CH_3CH_2)_4NBF_4$, $(CH_3CH_2)_4NPF_6$, $(CH_3CH_2)_4NClO_4$, $(CH_3CH_2)_4PBF_4$, $(CH_3CH_2)_4PPF_6$, $(CH_3CH_2)_4PClO_4$, $(CH_3)_4PBF_4$, $(CH_3)_4PPF_6$, $(CH_3)_4PClO_4$, $(CH_3CH_2CH_2)_4PBF_4$, $(CH_3CH_2CH_2)_4PPF_6$, $(CH_3CH_2CH_2)_4PClO_4$, $(CH_3CH_2CH_2)_4NBF_4$, $(CH_3CH_2CH_2)_4NPF_6$, $(CH_3CH_2CH_2)_4NClO_4$, $(CH_3)_4NBF_4$, $(CH_3)_4NPF_6$, $(CH_3)_4NClO_4$, $(CH_3CH_2CH_2)_4PBF_4$, $(CH_3CH_2CH_2CH_2)_4PPF_6$, $(CH_3CH_2CH_2CH_2)_4PClO_4$, $(CH_3CH_2CH_2CH_2)_4NBF_4$, $(CH_3CH_2CH_2CH_2)_4NPF_6$, $(CH_3CH_2CH_2CH_2)_4NClO_4$, $(CH_3CH_2)_4NSO_2CF_3$, $(CH_3CH_2)_4NN(SO_2CF_3)_2$, $(CH_3CH_2)_4NSO_3C_4F_9$, $(CH_3CH_2)_4NB(CH_3CH_2)_4$, and the like can be used. When carbon material is used as the active material, the charging capacity can be increased by utilizing concurrently the intercalation reaction of lithium ions. Therefore, the lithium salt indicated for a lithium battery can be used as the electrolyte for the electrochemical capacitors.

(Polymer Electrolyte)

The polymer electrolyte can be manufactured by mixing, or heating to dissolve together and cooling, the electrolyte containing the above fluorinated solvent with an appropriate amount of polymer such as polyvinylidene fluoride, polyacrylonitrile, polyethylene oxide, and the like. Otherwise, the polymer electrolyte can be manufactured by impregnating the electrolyte containing the above fluorinated solvent into a foamed polymer base material such as polyvinylidene fluoride, polyurethane, and the like. Otherwise, the polymer electrolyte can be manufactured by mixing the electrolyte containing the above fluorinated solvent with a monomer, or an oligomer of methacrylic acid derivative having double bond therein, and curing by heating the mixture. As the non-aqueous electrolyte to be mixed with the above monomer, or oligomer, the electrolyte for the lithium battery described above can be used.

(Lithium Primary Battery)

The lithium primary battery used in accordance with the present invention can be manufactured by using a lithium metal as a negative electrode; using a fabricated pellet of manganese dioxide as a positive electrode of a coin type battery, or using manganese dioxide applied onto both side planes of aluminum foil as a positive electrode, which is laminated with a lithium metal foil negative electrode via a polymer separator and is wound to form an electrode group; and inserting the electrode group into a cylindrical battery can to form a cylindrical battery by sealing.

Furthermore, in addition to metallic lithium, the negative electrode can be formed with a material which can intercalate-deintercalate lithium, for instance, a lithium-aluminum alloy, carbon material, for example, cokes, graphite, and the like. In addition to manganese dioxide, the positive electrode can be formed with an oxide containing at least one of metallic materials such as cobalt, nickel, niobium, vanadium, and the like.

(Lithium Secondary Battery)

As the negative electrode of the lithium secondary battery, metallic lithium; an alloy of lithium with aluminum; natural or artificial graphite and amorphous carbon materials; or complex materials of carbon with a material such as silicon, germanium, aluminum, gold, and the like, which form an alloy with lithium, can be used.

As materials for the positive electrode, a complex oxide of lithium with cobalt, nickel, iron, and the like; a material obtained by adding any of the transition metals, silicon, germanium, aluminum, manganese, magnesium, and the like to the above complex oxide, and lithium manganate and a material obtained by adding and mixing any of lithium, transition metals, silicon, germanium, aluminum, manganese, magnesium, and the like, to lithium manganate; can be used. As a material for the separator, a micro-porous film of a polymer such as polyethylene, polypropylene, vinylene copolymer, butylene, and the like, or a micro-porous film obtained by laminating the above film to two layers, or three layers can be used.

(Polymer Secondary Battery)

A polymer secondary battery can be formed by interposing the above polymer electrolyte and lithium between the negative electrode and the positive electrode, which can intercalate-deintercalate lithium. Otherwise, the polymer electrolyte can be used by being impregnated into microporous film made of polyethylene, polypropylene, polybutene, and the like. The negative electrode and the positive electrode described in connection with the above lithium secondary battery can be preferably used.

(Electrochemical Capacitor)

The electrochemical capacitor is formed, using a carbon material having a large specific surface area as polarizable electrodes of the positive electrode and the negative electrode, by laminating or winding these electrodes via a separator, and pouring an electrolyte. The electrolyte can be used as a gel state polymer electrolyte by mixing a polymer, in addition to a liquid electrolyte. As the polarizable carbon material having a large specific surface area, glassy carbon, carbon black, carbon fiber, activated carbon micro-bead, activated carbon fiber, and the like can be used. In addition to the above carbon material, organic compounds such as pyrrole compounds, and aniline group compounds can be used as the polarizable electrode material. As the separator, the material described previously can be used.

BRIEF DESCRIPTION OF THE DRAWINGS

These and other objects, features and advantages of the present invention will be understood more clearly from the following detailed description, when taken with reference to the accompanying drawings, wherein.

DETAILED DESCRIPTION OF THE PREFERRED EMBODIMENTS

Figure 1:
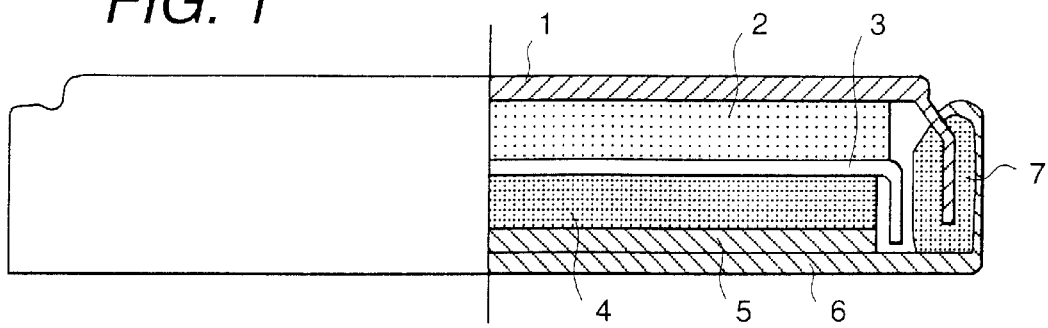
FIG. 1 is a partial cross section of a coin type lithium primary battery representing an embodiment of the present invention.

Hereinafter, details of the present invention will be explained with reference to various embodiments. However, the present invention is not restricted by the disclosed embodiments.

Non-aqueous Electrolyte Using Lithium Salt as the Supporting Electrolyte

COMPARATIVE EXAMPLE 1

The electrolyte A of the comparative example 1 was prepared by mixing ethylene carbonate (hereinafter, called as EC) and dimethyl carbonate (hereinafter, called as DMC) in a ratio of EC:DMC=33:67 by volume as the organic solvent, and dissolving $LiPF_6$ of 1 M (mole/liter) therein as lithium salt. The charge-discharge performance of the battery was influenced significantly by the diffusivity of mobile ions into the electrodes. Accordingly, the performance of the electrolyte was evaluated by the self diffusion coefficient of the mobile ions (refer to New York, 1996, p. 1626–1644, and others). The evaluation was performed at 25° C. The diffusion coefficient of lithium ions in the electrolyte A measured by the above method was $3\times10^{-10}$ $m^2$/sec.

Embodiment 1

The electrolyte 1 of the embodiment 1 was prepared by mixing ethylene carbonate (hereinafter, called as EC) and dimethyl carbonate (hereinafter, called as DMC) as organic solvents, and ethyl-2, 2, 3, 3, 4, 4, 5, 5-octafluoropenthylate $(HCF_2(CF_2)_3$ COOEt: hereinafter, called as EOFPA) as a fluorinated solvent in a ratio of EC:DMC:EOFPA=32:63:5 by volume, and dissolving $LiPF_6$ of 1 M (mole/liter) therein as lithium salt. The diffusion coefficient of lithium ions in the electrolyte 1 measured by PFG-NMR method was $7\times10^{-10}$ $m^2$/sec. The diffusion coefficient in the electrolyte 1 was increased by $4\times10^{-10}$ $m^2$/sec in comparison with the comparative example 1.

Embodiment 2

The electrolyte 2 of the embodiment 2 was prepared by mixing EC and DMC as organic solvents, and 2, 2, 3, 3, 4, 4, 5, 5-octafluoropentane-1-iodide $(HCF_2(CF_2)_3$ $CH_2I$: hereinafter, called as IOFP) as a fluorinated solvent in a ratio of EC:DMC:IOFP=32:63:5 by volume, and dissolving $LiPF_6$ of 1 M (mole/liter) therein as lithium salt. The diffusion coefficient of lithium ions in the electrolyte 2 measured by PFG-NMR method was $8\times10^{-10}$ $m^2$/sec. The diffusion coefficient in the electrolyte 2 was increased by $5\times10^{-10}$ m2/sec in comparison with the comparative example 1.

Embodiment 3

The electrolyte 3 of the embodiment 3 was prepared by mixing EC and DMC as organic solvents, and 2, 7-di-trifluoromethyl-1, 1, 1, 2, 3, 3, 4, 4, 5, 5, 6, 6, 7, 8, 8, 8-heptadecafluorooctane $(FC(CF_3)_2$ $(CF_2)_4(CF_3)_2CF$: hereinafter, called as TFHFO) as fluorinated solvent in a ratio of EC:DMC:TFHFO=32:63:5 by volume, and dissolving $LiPF_6$ of 1 M (mole/liter) therein as lithium salt. The diffusion coefficient of lithium ions in the electrolyte 3 measured by PFG-NMR method was $9\times10^{-10}$ $m^2$/sec. The diffusion coefficient of the mobile ions in the electrolyte 3 was increased by $6 \times 10^{-10}$ m$^2$/sec in comparison with the comparative example 1.

As explained above, the self-diffusivity of lithium ions in the non-aqueous electrolyte can be increased by mixing a fluorinated solvent, which has a structure in which the terminal ends of the molecule are partially fluorinated, into the electrolyte.

Embodiment 4

The electrolyte 4 of the embodiment 4 was prepared by mixing EC and DMC as organic solvents, and 1, 1, 2, 2-tetrafluoropropyl methyl ether (H(CF$_2$)$_2$OCH$_3$: hereinafter, called as FPME) as a fluorinated solvent in a ratio of EC:DMC:FPME=32:63:5 by volume, and dissolving LiPF$_6$ of 1 M (mole/liter) therein as lithium salt. The diffusion coefficient of lithium ions in the electrolyte 4 measured by PFG-NMR method was $13 \times 10^{-10}$ m$^2$/sec. The diffusion coefficient of the mobile ions in the electrolyte 4 was increased by one order in comparison with the comparative example 1, and increased by $4 \times 10^{-10}$/sec in comparison with the embodiment 3.

As explained above, the diffusivity of lithium ions was improved significantly by providing an ether group having an appropriate polarity as a functional group of the fluorinated solvent in comparison with a case when no functional group was provided, or the functional group was an ester group.

Embodiment 5

The electrolyte 5 of the embodiment 5 was prepared by mixing EC and DMC as organic solvents, and 1, 1, 2, 3, 3, 3-hexafluoropropyl methyl ether (CF$_3$CHFCF$_2$OCH$_3$: hereinafter, called as FPME) as a fluorinated solvent in a ratio of EC:DMC:FPME=32:63:5 by volume, and dissolving LiPF$_6$ of 1 M (mole/liter) therein as lithium salt. The diffusion coefficient of lithium ions in the electrolyte 5 measured by PFG-NMR method was $17 \times 10^{-10}$ m$^2$/sec. The diffusion coefficient of the mobile ions in the electrolyte 5 was increased by $14 \times 10^{-10}$ m$^2$/sec in comparison with the comparative example 1, and increased by $4 \times 10^{-10}$ m$^2$/sec in comparison with the embodiment 4.

As explained above, the ether having a CF$_3$CHF structure at a terminal end of fluorinated alkyl group has an effect to improve diffusivity of lithium ions further.

Embodiment 6

The electrolyte 6 of the embodiment 6 was prepared by mixing EC and DMC as organic solvents, and 2-trifluoromethyl- 1, 1, 2, 3, 3, 3-hecafluoropropyl methyl ether (FC(CF$_3$)$_2$CF$_2$OCH$_3$: hereinafter, called as HFEI) as a fluorinated solvent in a ratio of EC:DMC:HFEI=32:63:5 by volume, and dissolving LiPF$_6$ of 1 M (mole/liter) therein as lithium salt. The diffusion coefficient of lithium ions in the electrolyte 6 measured by PFG-NMR method was $19 \times 10^{-10}$ m$^2$/sec. The diffusion coefficient of the mobile ions in the electrolyte 6 was increased by $16 \times 10^{-10}$ m$^2$/sec in comparison with the comparative example 1, and increased by $6 \times 10^{-10}$ m$^2$/sec in comparison with the embodiment 4.

As explained above, the ether having two CF$_3$ groups at terminal ends of the molecule has an effect to improve diffusivity of lithium ions further.

Embodiment 7

HFEI and its isomer, (CF$_3$(CF$_2$)$_3$OCH$_3$: hereinafter, called as HFEN) were mixed in a ratio of HFEI:HFEN= 80:20 by volume to obtain the fluorinated solvent HFE1. The electrolyte 7 of the embodiment 7 was prepared by mixing EC, DMC, and HFE1 in a ratio of EC:DMC:HFE1=32:63:5 by volume, and dissolving LiPF$_6$ of 1 M (mole/liter) therein as lithium salt. The diffusion coefficient of lithium ions in the electrolyte 7 measured by PFG-NMR method was $22 \times 10^{-10}$ m$^2$/sec.

Embodiment 8

The fluorinated solvent HFE2 was prepared by mixing HFEI and HFEN in a ratio of HFEI:HFEN=60:40 by volume. The electrolyte 8 of the embodiment 8 was prepared by mixing EC, DMC, and HFE2 in a ratio of EC:DMC:HFE2= 32:63:5 by volume, and dissolving LiPF$_6$ of 1 M (mole/liter) therein as lithium salt. The diffusion coefficient of lithium ions in the electrolyte 8 measured by PFG-NMR method was $24 \times 10^{-10}$ m$^2$/sec.

Embodiment 9

The fluorinated solvent HFE3 was prepared by mixing HFEI and HFEN in a ratio of HFEI:HFEN=40:60 by volume. The electrolyte 9 of the embodiment 9 was prepared by mixing EC, DMC, and HFE3 in a ratio of EC:DMC:HFE2= 32:63:5 by volume, and dissolving LiPF$_6$ of 1 M (mole/liter) therein as lithium salt. The diffusion coefficient of lithium ions in the electrolyte 9 measured by PFG-NMR method was $20 \times 10^{-10}$ m$^2$/sec.

As explained above, the diffusivity of lithium ions could be improved by using HFE1 as the fluorinated solvent, and its advantage becomes further significant by using a mixture with HFEN. In the case of mixing HFE1 with HFEN, HFE2 prepared my mixing HFE1 with HFEN in a ratio of HFE1:HFEN=60:40 was the most effective.

Embodiment 10

The fluorinated solvent HFE2, which was prepared by mixing HFEI and HFEN in a ratio of HFEI:HFEN=60:40 by volume, was mixed with EC and DMC in a ratio of EC:DMC:HFE2=30:60:10 by volume, and dissolving LiPF$_6$ of 0.8 M (mole/liter) and LiN(SO$_2$CF$_2$CF$_3$)$_2$ (hereinafter, called as LiBETI) of 0.4 M(mole/liter) therein as lithium salt to prepare the electrolyte 10 of the embodiment 10. The diffusion coefficient of lithium ions in the electrolyte 10 measured by PFG-NMR method was $26 \times 10^{-10}$ m$^2$/sec.

As explained above, the effect to improve the diffusivity of ions is enhanced further by increasing the amount of the mixing fluorinated solvent. In accordance with this system, if the amount of the mixing fluorinated solvent is increased, phase separation of the solution is generated. In order to prevent the separation, an organic lithium salt, LiBETI, was added. By making the salt co-exist, or be a main supporting electrolyte, it becomes possible to mix the fluorinated solvent stably in a wide range of mixing amount to a high concentration.

Embodiment 11

The electrolyte 11 of the embodiment 11 was prepared by mixing HFE2 with EC and DMC in a ratio of EC:DMC:HFE2=20:60:20 by volume, and dissolving LiPF$_6$ of 0.6 M (mole/liter) and LiBETI of 0.8 M (mole/liter) therein as lithium salt. The diffusion coefficient of lithium ions in the electrolyte 11 measured by PFG-NMR method was $28 \times 10^{-10}$ m$^2$/sec.

Embodiment 12

The electrolyte 12 of the embodiment 12 was prepared by mixing HFE2 with EC and DMC in a ratio of EC:DMC:HFE2=10:60:30 by volume, and dissolving LiPF$_6$ of 0.3 M (mole/liter) and LiBETI of 0.9 M (mole/liter) therein as lithium salt. The diffusion coefficient of lithium ions in the electrolyte 12 measured by PFG-NMR method was 30×10$^{-10}$ m$^2$/sec.

Embodiment 13

The electrolyte 13 of the embodiment 13 was prepared by mixing HFE2 with EC and DMC in a ratio of EC:DMC:HFE2=10:50:40 by volume, and dissolving LiPF$_6$ of 0.1 M (mole/liter) and LiBETI of 1.1 M (mole/liter) therein as lithium salt. The diffusion coefficient of lithium ions in the electrolyte 13 measured by PFG-NMR method was 25×10$^{-10}$ m$^2$/sec.

As explained above, the effect to improve the diffusivity of ions is enhanced further by increasing the amount of the mixing fluorinated solvent, HFE2. In the HFE2 system, mixing the HFE2 by 30% was the most effective.

COMPARATIVE EXAMPLE 2

The electrolyte B of the comparative example 2 was prepared by mixing ethyl methyl carbonate (hereinafter, called as EMC) and EC in a ratio of EMC:EC=33:67 by volume as the organic solvent, and dissolving LiPF$_6$ of 1 M (mole/liter) therein as lithium salt. The diffusion coefficient of lithium ions in the electrolyte C measured by PFG-NMR method was 2×10$^{-10}$ m$^2$/sec.

Embodiment 14

The electrolyte 14 of the embodiment 14 was prepared by mixing HFE2 with EC and EMC in a ratio of EC:EMC:HFE2=32:63:5 by volume as solvent, and dissolving LiPF$_6$ of 1 M (mole/liter) therein as lithium salt. The diffusion coefficient of lithium ions in the electrolyte 14 measured by PFG-NMR method was 22×10$^{-10}$ m$^2$/sec.

As explained above, the diffusion coefficient in the electrolyte 14 is more than 10 times of that in the comparative example 2 even if the kind of linear chain carbonate is varied, and the fluorinated solvent operates effectively notwithstanding the kind of the linear chain carbonate.

COMPARATIVE EXAMPLE 3

The electrolyte C of the comparative example 3 was prepared by mixing propylene carbonate (hereinafter, called as PC) and dimethoxy ethane (hereinafter, called as DME) in a ratio of PC:DME=30:70 by volume as the organic solvent, and dissolving LiSO$_3$CF$_3$ of 1.5 M (mole/liter) therein as lithium salt. The diffusion coefficient of lithium ions in the electrolyte C measured by PFG-NMR method was 2×10$^{-10}$ m$^2$/sec.

Embodiment 15

The electrolyte 15 of the embodiment 15 was prepared by mixing HFE2 with PC and DME in a ratio of PC:DME:HFE2=32:63:5 by volume as a solvent, and dissolving LiSO$_3$CF$_3$ of 1.5 M (mole/liter) therein as lithium salt. The diffusion coefficient of lithium ions in the electrolyte 15 measured by PFG-NMR method was 17×10$^{-10}$ m$^2$/sec.

As explained above, the diffusion coefficient in the electrolyte 15 is more than 8 times of that in the comparative example 3 even if the kind of solvent and supporting electrolyte are varied, and the fluorinated solvent operates effectively regardless of the kind of solvent and the supporting electrolyte.

As explained above, the effect of mixing the fluorinated solvent is clear to the non-aqueous electrolyte systems which are widely used for lithium primary batteries.

Non-aqueous Electrolyte Using Quaternary Onium Salt as the Supporting Electrolyte

COMPARATIVE EXAMPLE 4

The electrolyte D of the comparative example 4 was prepared by using PC as the organic solvent, and dissolving tetraethyl ammonium tetrafluoroborate, (Et)$_4$NBF$_4$ of 0.6 M (mole/liter) therein as a quaternary onium salt. The diffusion coefficient of ammonium ions in the electrolyte D measured by PFG-NMR method was 7×10$^{-10}$ m$^2$/sec.

Embodiment 16

The electrolyte 16 of the embodiment 16 was prepared by using a mixture of PC:DEC:EOFPA (HCF$_2$(CF$_2$)$_3$COOEt)= 85:10:5 as solvent, and dissolving (Et)$_4$NBF$_4$ of 0.6 M (mole/liter) therein. The diffusion coefficient of ammonium ions in the electrolyte 16 measured by PFG-NMR method was 12×10$^{-10}$ m$^2$/sec.

In comparison with the comparative example 4, the diffusion coefficient of the mobile ions in the electrolyte 16 was increased by 5×10$^{-10}$ m$^2$/sec. It was revealed that, even if the mobile ions were ammonium ions, the diffusivity was increased by mixing the fluorinated solvent.

Embodiment 17

The electrolyte 17 of the embodiment 17 was prepared by using a mixture of PC:DEC:IOFP (HCF$_2$(CF$_2$)$_3$CH$_2$I)= 85:10:5 as solvent, and dissolving (Et)$_4$NBF$_4$ of 0.6 M (mole/liter) therein. The diffusion coefficient of ammonium ions in the electrolyte 17 measured by PFG-NMR method was 13×10$^{-10}$ m$^2$/sec.

In comparison with the comparative example 4, the diffusion coefficient of the mobile ions in the electrolyte 17 was increased by 6×10$^{-10}$ m$^2$/sec.

Embodiment 18

The electrolyte 18 of the embodiment 18 was prepared by using a mixture of PC:DEC:TFHFO (FC(CF$_3$)$_2$(CF$_2$)$_4$CF (CF$_3$)$_2$)=85:10:5 as a solvent, and dissolving (Et)$_4$NBF$_4$ of 0.6 M (mole/liter) therein. The diffusion coefficient of ammonium ions in the electrolyte 18 measured by the PFG-NMR method was 14×10$^{-10}$ m$^2$/sec.

In comparison with the comparative example 4, the diffusion coefficient of the mobile ions in the electrolyte 18 was increased by 7×10$^{-10}$ m$^2$/sec.

Embodiment 19

The electrolyte 19 of the embodiment 19 was prepared by using a mixture of PC:DEC:FPME (H(CF$_2$)$_2$OCH$_3$)= 85:10:5 as a solvent, and dissolving (Et)$_4$NBF$_4$ of 0.6 M (mole/liter) therein. The diffusion coefficient of ammonium ions in the electrolyte 19 measured by the PFG-NMR method was 18×10$^{-10}$ m$^2$/sec.

In comparison with the comparative example 4, the diffusion coefficient of the mobile ions in the electrolyte 19 was increased by 11×10$^{-10}$ m$^2$/sec. Even in comparison with the embodiment 18, the diffusion coefficient of the mobile ions in the electrolyte 19 was increased by 4×10$^{-10}$ m$^2$/sec. As explained above, the diffusivity is further increased by using fluorinated ether.

Embodiment 20

The electrolyte 20 of the embodiment 20 was prepared by using a mixture of PC:DEC:HFPME (CF$_3$CHFCF$_2$OCH$_3$)= 85:10:5 as a solvent, and dissolving (Et)$_4$NBF$_4$ of 0.6 M (mole/liter) therein. The diffusion coefficient of ammonium ions in the electrolyte 20 measured by the PFG-NMR method was 21×10$^{-10}$ m$^2$/sec.

In comparison with the comparative example 4, the diffusion coefficient of the mobile ions in the electrolyte 20 was increased by 14×10$^{-10}$ m$^2$/sec. Even in comparison with the embodiment 19, the diffusion coefficient of the mobile ions in the electrolyte 20 was increased by 3×10$^{-10}$ m$^2$/sec. As explained above, the diffusivity is further increased by using fluorinated alkyl of a structure having CF$_3$-branched chain at the terminal end of the fluorinated alkyl.

Embodiment 21

The electrolyte 21 of the embodiment 21 was prepared by using a mixture of PC:DEC:HFEI (FC(CF$_3$)$_2$CF$_2$OCH$_3$)= 85:10:5 as a solvent, and dissolving (Et)$_4$NBF$_4$ of 0.6 M (mole/liter) therein. The diffusion coefficient of ammonium ions in the electrolyte 21 measured by PFG-NMR method was 24×10$^{-10}$ m$^2$/sec.

In comparison with the comparative example 4, the diffusion coefficient of the mobile ions in the electrolyte 21 was increased by 17×10$^{-10}$ m$^2$/sec. As explained above, the effect is further increased by using perfluoroalkyl alkyl ether.

Embodiment 22

The fluorinated solvent HFE1, which was prepared by mixing HFEI and HFEN in a ratio of HFEI:HFEN (CF$_3$(CF$_2$)$_3$OCH$_3$)=80:20 by volume, was used as a solvent. The solvent was further mixed with PC and DEC in a ratio of PC:DEC:HFE1=85:10:5 by volume, and dissolving (Et)$_4$NBF$_4$ of 0.6 M (mole/liter) therein to prepare the electrolyte 22 of the embodiment 22. The diffusion coefficient of ammonium ions in the electrolyte 22 measured by the PFG-NMR method was 27×10$^{-10}$ m$^2$/sec.

As explained above, the diffusivity of ions is increased by using the fluoroalkyl ether having a branched chain structure mixed with the fluoroalkyl ether having a linear chain structure.

Embodiment 23

The fluorinated solvent HFE2, which was prepared by mixing HFEI and HFEN in a ratio of HFEI:HFEN=60:40 by volume, was used as a solvent. The solvent was further mixed with PC and DEC in a ratio of PC:DEC:HFE2= 85:10:5 by volume, and dissolving (Et)$_4$NBF$_4$ of 0.6 M (mole/liter) therein to prepare the electrolyte 23 of the embodiment 23. The diffusion coefficient of ammonium ions in the electrolyte 23 measured by the PFG-NMR method was 29×10$^{-10}$ m$^2$/sec.

As explained above, the diffusion coefficient of the ions becomes higher than that in the embodiment 22 by 2×10$^{-10}$ m$^2$/sec. The diffusivity of ions is increased by adjusting the mixing ratio of the HFEI and HFEN.

Embodiment 24

The fluorinated solvent HFE3, which was prepared by mixing HFEI and HFEN in a ratio of HFEI:HFEN=40:60 by volume, was used as a solvent. The solvent was further mixed with PC and DEC in a ratio of PC:DEC:HFE3= 85:10:5 by volume, and dissolving (Et)$_4$NBF$_4$ of 0.6 M (mole/liter) therein to prepare the electrolyte 24 of the embodiment 24. The diffusion coefficient of ammonium ions in the electrolyte 24 measured by the PFG-NMR method was 25×10$^{-10}$ m$^2$/sec.

As explained above, the diffusion coefficient of the ions becomes higher than that in the embodiment 21 by 1×10$^{-10}$ m2/sec. The effect of increasing the diffusivity of ions was highest when the HFEI was mixed with HFEN in a ratio of approximately HFEI:HFEN=60:40 by volume.

Polymer Electrolyte

COMPARATIVE EXAMPLE 5

The polymer electrolyte E of the comparative example 5 was prepared by mixing the organic solvent with polyvinylidene fluoride (hereinafter, called as PVDF) in a ratio of EC:DMC:PVDF=20:50:30 by weight, and dissolving LiTFSI of 1.5 M (mole/liter) therein as lithium salt. The diffusion coefficient of lithium ions in the polymer electrolyte E of the comparative example 5 measured by the PFG-NMR method was 2×10$^{-11}$ m$^2$/sec.

Embodiment 25

The polymer electrolyte 25 of the embodiment 25 was prepared by mixing the organic solvent, fluorinated solvent (EOFPA: HCF$_2$(CF$_2$)$_3$ COOEt), and PVDF in a ratio of EC:DMC:EOFPA:PVDF=20:45:5:30 by weight, and dissolving LiTFSI of 1.5 M (mole/liter) therein as lithium salt. The diffusion coefficient of lithium ions in the polymer electrolyte 25 measured by the PFG-NMR method was 4×10$^{-11}$ m$^2$/sec.

As explained above, the effect to increase diffusivity is realized by mixing the fluorinated solvent into the polymer electrolyte.

Embodiment 26

The polymer electrolyte 26 of the embodiment 26 was prepared by mixing the organic solvent, fluorinated solvent (IOFP: HCF$_2$(CF$_2$)$_3$CH$_2$I), and PVDF in a ratio of EC:DMC:IOFP:PVDF=20:45:5:30 by weight, and dissolving LiTFSI of 1.5 M (mole/liter) therein as lithium salt. The diffusion coefficient of lithium ions in the polymer electrolyte 26 measured by the PFG-NMR method was 5×10$^{-11}$ m$^2$/sec.

The diffusivity of the polymer electrolyte was increased from the electrolyte of the comparative example 5 by 3×10$^{-11}$ m$^2$/sec, and from the electrolyte of the embodiment 25 by 1×10$^{-11}$ m$^2$/sec.

Embodiment 27

The polymer electrolyte 27 of the embodiment 27 was prepared by mixing the organic solvent, fluorinated solvent (TFHFO: FC(CF$_3$)$_2$(CF$_2$)$_4$(CF$_3$)$_2$CF), and PVDF in a ratio of EC:DMC:TFHFO:PVDF=20:45:5:30 by weight, and dissolving LiTFSI of 1.5 M (mole/liter) therein as lithium salt. The diffusion coefficient of lithium ions in the polymer electrolyte 27 measured by the PFG-NMR method was 6×10$^{-11}$ m$^2$/sec.

The diffusivity of the polymer electrolyte was increased from the electrolyte of the embodiment 26 by 1×10$^{-11}$ m$^2$/sec.

Embodiment 28

The polymer electrolyte 28 of the embodiment 28 was prepared by mixing the organic solvent, fluorinated solvent (TFHFO: $FC(CF_3)_2(CF_2)_4(CF_3)_2CF$), and PVDF in a ratio of EC:DMC:TFHFO:PVDF=20:45:5:30 by weight, and dissolving LiTFSI of 1.5 M (mole/liter) therein as lithium salt. The diffusion coefficient of lithium ions in the polymer electrolyte 28 measured by the PFG-NMR method was $8 \times 10^{-11}$ m$^2$/sec.

The diffusivity of the polymer electrolyte was increased from the electrolyte of the embodiment 27 by $2 \times 10^{-11}$ m$^2$/sec.

Embodiment 29

The polymer electrolyte 29 of the embodiment 29 was prepared by mixing the organic solvent, fluorinated solvent (HFPME: $CF_3CHFCF_2OCH_3$), and PVDF in a ratio of EC:DMC:HFPME:PVDF=20:45:5:30 by weight, and dissolving LiTFSI of 1.5 M (mole/liter) therein as lithium salt. The diffusion coefficient of lithium ions in the polymer electrolyte 29 measured by the PFG-NMR method was $11 \times 10^{-11}$ m$^2$/sec.

The diffusivity of the polymer electrolyte was increased from the electrolyte of the embodiment 28 by $3 \times 10^{-11}$ m$^2$/sec. The diffusivity can be increased further by using fluorinated ether as the fluorinated solvent.

Embodiment 30

The polymer electrolyte 30 of the embodiment 30 was prepared by mixing the organic solvent, fluorinated solvent (HFEI: $FC(CF_3)_2CF_2OCH_3$), and PVDF in a ratio of EC:DMC:HFEI:PVDF=20:45:5:30 by weight, and dissolving LiTFSI of 1.5 M (mole/liter) therein as lithium salt. The diffusion coefficient of lithium ions in the polymer electrolyte 30 measured by the PFG-NMR method was $15 \times 10^{-11}$ m$^2$/sec.

The diffusivity of the polymer electrolyte 30 was increased from the electrolyte of the embodiment 29 by $4 \times 10^{-11}$ m2/sec. The diffusivity can be increased further by using perfluoroalkyl ether having a $CF_3$ branch as a fluorinated alkyl chain.

Embodiment 30

The polymer electrolyte 30 of the embodiment 30 was prepared by mixing the organic solvent, fluorinated solvent (HFEI: $FC(CF_3)_2CF_2OCH_3$), and PVDF in a ratio of EC:DMC:HFEI:PVDF=20:45:5:30 by weight, and dissolving LiTFSI of 1.5 M (mole/liter) therein as lithium salt. The diffusion coefficient of lithium ions in the polymer electrolyte 30 measured by the PFG-NMR method was $15 \times 10^{-11}$ m$^2$/sec.

The diffusivity of the polymer electrolyte 30 was increased from the electrolyte of the embodiment 29 by $4 \times 10^{-11}$ m$^2$/sec. The diffusivity can be increased further by using perfluoroalkyl ether having a $CF_3$ branch as fluorinated alkyl chain.

Embodiment 31

The polymer electrolyte 31 of the embodiment 31 was prepared by mixing the organic solvent, fluorinated solvent HFE2 which is obtained by mixing HFEI and HFEN ($CF_3(CF_2)_3OCH_3$) in a ratio of HFEI:HFEN=60:40, and PVDF in a ratio of EC:DMC:HFE2:PVDF=15:50:5:30 by weight, and dissolving LiTFSI of 1.5 M (mole/liter) therein as lithium salt. The diffusion coefficient of lithium ions in the polymer electrolyte 31 measured by the PFG-NMR method was $17 \times 10^{-11}$ m$^2$/sec.

The diffusivity of the polymer electrolyte 31 was increased from the electrolyte of the embodiment 30 by $2 \times 10^{-11}$ m$^2$/sec. The diffusivity can be increased further by using a mixture of fluorinated ether having a branched chain structure with fluorinated ether having a linear chain structure.

Embodiment 32

The polymer electrolyte 32 of the embodiment 32 was prepared by mixing the organic solvent, fluorinated solvent HFE2, and PVDF in a ratio of EC:DMC:HFE2:PVDF=15:45:10:30 by weight, and dissolving LiTFSI of 1.5 M (mole/liter) therein as lithium salt. The diffusion coefficient of lithium ions in the polymer electrolyte 32 measured by the PFG-NMR method was $19 \times 10^{-11}$ m$^2$/sec.

The diffusivity of the polymer electrolyte 32 was increased from the electrolyte of the embodiment 31 by $2 \times 10^{-11}$ m$^2$/sec.

Embodiment 33

The polymer electrolyte 33 of the embodiment 33 was prepared by mixing the organic solvent, fluorinated solvent HFE2, and PVDF in a ratio of EC:DMC:HFE2:PVDF=10:45:15:30 by weight, and dissolving LiTFSI of 1.5 M (mole/liter) therein as lithium salt. The diffusion coefficient of lithium ions in the polymer electrolyte 33 measured by the PFG-NMR method was $22 \times 10^{-11}$ m$^2$/sec.

The diffusivity of the polymer electrolyte 33 was increased from the electrolyte of the embodiment 32 by $3 \times 10^{-11}$ m$^2$/sec.

Embodiment 34

The polymer electrolyte 34 of the embodiment 34 was prepared by mixing the organic solvent, fluorinated solvent HFE2, and PVDF in a ratio of EC:DMC:HFE2:PVDF=10:40:20:30 by weight, and dissolving LiTFSI of 1.5 M (mole/liter) therein as lithium salt. The diffusion coefficient of lithium ions in the polymer electrolyte 34 measured by PFG-NMR method was $20 \times 10^{-11}$ m$^2$/sec.

The diffusivity of the polymer electrolyte 34 was increased from the electrolyte of the embodiment 32 by $1 \times 10^{-11}$ m$^2$/sec. In case of HFE2, the largest effect could be obtained by a concentration of approximately 15% by weight.

Lithium Primary Battery

COMPARATIVE EXAMPLE 6

A coin type lithium primary battery having a structure as illustrated in FIG. 1 was prepared, and the discharge performance of the battery at a low temperature was evaluated. The battery F of the comparative example 6 used for comparison was prepared by the following steps. Manganese dioxide was used as a positive electrode active material; carbon powder was used as a conductive assistant agent; polyvinylidene fluoride (PVDF) was used as a binding agent, these materials were mixed in a ratio of $MnO_2$:carbon powder: PVDF=85:8:7; a positive pole 4 was prepared by fabricating the mixture in a disc shape by pressing, and sintering at 250° C.; and a positive electrode was prepared by crimping the positive pole 4 to the positive pole electric collector 5. The negative electrode 2 was prepare by stumping a lithium rolled plate in a designated size. Then, an electrolyte was prepared by dissolving $LiSO_3CF_3$ of 1 M (mole/liter) into PC, and the electrolyte was impregnated into a separator 3 made of polypropylene. The positive electrode was inserted in a positive can 6 so that the positive pole electric collector 5 was contacted with the positive electrode can 6; the separator 3 wherein the electrolyte was impregnated was inserted thereon; the negative electrode 2 was inserted thereon; the negative electrode cap 1 was placed thereon; and the coin type lithium primary battery was obtained by caulking the negative electrode cap 1 to the positive electrode can 6. A hermetic seal between the positive can 6 and the negative cap 1 is ensured by the gasket 7 made of polypropylene.

The discharge time t of the battery F at 0° C. was measured with a resistance of 30 kΩ was connected between its terminals and the battery was discharged with a constant current until the voltage reached 2 V. The discharge time t of the battery F was 2000 hours.

Embodiment 35

The electrolyte 35 of the embodiment 35 was prepared by mixing PC and EOFPA(HCF$_2$(CF$_2$)$_3$COOEt) in a ratio of PC:EOFPA=95:5 by volume, and dissolving LiSO$_3$CF$_3$ of 1 M (mole/liter) therein. The battery 35 of the embodiment 35 was manufactured by the same method as the comparative example 6 using the electrolyte 35. The discharge time t of the battery 35 at 0° C. was 2100 hours. The battery 35 of the embodiment 35, the electrolyte of which contained EOFPA as the fluorinated solvent, had a discharge time longer than the discharge time of the battery F of the comparative example 6, the electrolyte of which did not contain the fluorinated solvent, by 100 hours at 0° C.

Embodiment 36

The electrolyte 36 of the embodiment 36 was prepared by mixing PC and IOFP (HCF$_2$(CF$_2$)$_3$CH$_2$I) in a ratio of PC:IOFP=95:5 by volume, and dissolving LiSO$_3$CF$_3$ of 1 M (mole/liter) therein. The battery 36 of the embodiment 36 was manufactured by the same method as the comparative example 6 using the electrolyte 36. The discharge time t of the battery 36 at 0° C. was 2150 hours. The battery 36 of the embodiment 36, the electrolyte of which contained IOFP as the fluorinated solvent, had a discharge time longer than the discharge time of the battery F of the comparative example 6, the electrolyte of which did not contain the fluorinated solvent, by 150 hours at 0° C.

Embodiment 37

The electrolyte 37 of the embodiment 37 was prepared by mixing PC and TFHFO (FC(CF$_3$)$_2$(CF$_2$)$_4$(CF$_3$)$_2$CF) in a ratio of PC:TFHFO=95:5 by volume, and dissolving LiSO$_3$CF$_3$ of 1 M (mole/liter) therein. The battery 37 of the embodiment 37 was manufactured by the same method as the comparative example 6 using the electrolyte 37. The discharge time t of the battery 37 at 0° C. was 2180 hours. The battery 37 of the embodiment 37, the electrolyte of which contained TFHFO as the fluorinated solvent, had a discharge time longer than the discharge time of the battery F of the comparative example 6, the electrolyte of which did not contain the fluorinated solvent, by 180 hours at 0° C.

As explained above, the discharge time at 0° C. can be extended by mixing the fluorinated solvent having a structure, the terminal end of the fluorinated alkyl of which is unsymmetrical, into the electrolyte, even though it may depend on the kind of the functional group in the molecule.

Embodiment 38

The electrolyte 38 of the embodiment 38 was prepared by mixing PC and FPME (H(CF$_2$)$_2$OCH$_3$) in a ratio of PC:FPME=95:5 by volume, and dissolving LiSO$_3$CF$_3$ of 1 M (mole/liter) therein. The battery 38 of the embodiment 38 was manufactured by the same method as the comparative example 6 using the electrolyte 38. The discharge time t of the battery 38 at 0° C. was 2200 hours. The battery 38 of the embodiment 38, the electrolyte of which contained FPME as the fluorinated solvent, had a discharge time longer than the discharge time of the battery F of the comparative example 6, the electrolyte of which did not contain the fluorinated solvent, by 200 hours at 0° C.

Furthermore, in comparison with the batteries of the embodiment 35–37, the discharge time t becomes longer by 20–100 hours, and the advantage is more significant if ether is used as the structure of the fluorinated solvent.

Embodiment 39

The electrolyte 39 of the embodiment 39 was prepared by mixing PC and HFPME (CF$_3$CHFCF$_2$OCH$_3$) in a ratio of PC:HFPME=95:5 by volume, and dissolving LiSO$_3$CF$_3$ of 1 M (mole/liter) therein. The battery 39 of the embodiment 39 was manufactured by the same method as the comparative example 6 using the electrolyte 39. The discharge time t of the battery 39 at 0° C. was 2230 hours. The battery 39 of the embodiment 39, the electrolyte of which contained HFPME as the fluorinated solvent, had a discharge time longer than the discharge time of the battery F of the comparative example 6, the electrolyte of which did not contain the fluorinated solvent, by 230 hours at 0° C.

Furthermore, in comparison with the battery of the embodiment 38, the discharge time t becomes longer by 30 hours, and the advantage is more significant if the fluorinated solvent, the structure of which has CF$_3$ group at the terminal end of the fluorinated alkyl, is used.

Embodiment 40

The electrolyte 40 of the embodiment 40 was prepared by mixing PC and HFEI (FC(CF$_3$)$_2$CF$_2$OCH$_3$) in a ratio of PC:HFEI=95:5 by volume, and dissolving LiSO$_3$CF$_3$ of 1 M (mole/liter) therein. The battery 40 of the embodiment 40 was manufactured by the same method as the comparative example 6 using the electrolyte 40. The discharge time t of the battery 40 at 0° C. was 2250 hours. The battery 40 of the embodiment 40, the electrolyte of which contained HFEI as the fluorinated solvent, had a discharge time longer than the discharge time of the battery F of the comparative example 6, the electrolyte of which did not contain the fluorinated solvent, by 250 hours at 0° C.

Furthermore, in comparison with the battery of the embodiment 39, the discharge time t becomes longer by 20 hours, and the advantage is more significant if perfluoroalkyl is used as the fluorinated alkyl chain of the fluorinated ether, the structure of which has CF$_3$ group at the terminal end of the fluorinated alkyl.

Embodiment 41

The electrolyte 41 of the embodiment 41 was prepared by mixing PC and HFEI (FC(CF$_3$)$_2$CF$_2$OCH$_3$) in a ratio of PC:HFEI=95:5 by volume, and dissolving LiSO$_3$CF$_3$ of 1 M (mole/liter) therein. The battery 41 of the embodiment 41 was manufactured by the same method as the comparative example 6 using the electrolyte 41. The discharge time t of the battery 41 at 0° C. was 2280 hours. The battery 41 of the embodiment 41, the electrolyte of which contained HFPME as the fluorinated solvent, had a discharge time longer than the discharge time of the battery F of the comparative example 6, the electrolyte of which did not contain the fluorinated solvent, by 280 hours at 0° C.

Furthermore, in comparison with the battery of the embodiment 40, the discharge time t becomes longer by 30 hours, and the advantage is more significant if a mixture of fluorinated ether solvent having a linear chain structure and fluorinated ether solvent having a branched chain structure is used.

Lithium Secondary Battery

COMPARATIVE EXAMPLE 7

Figure 2:
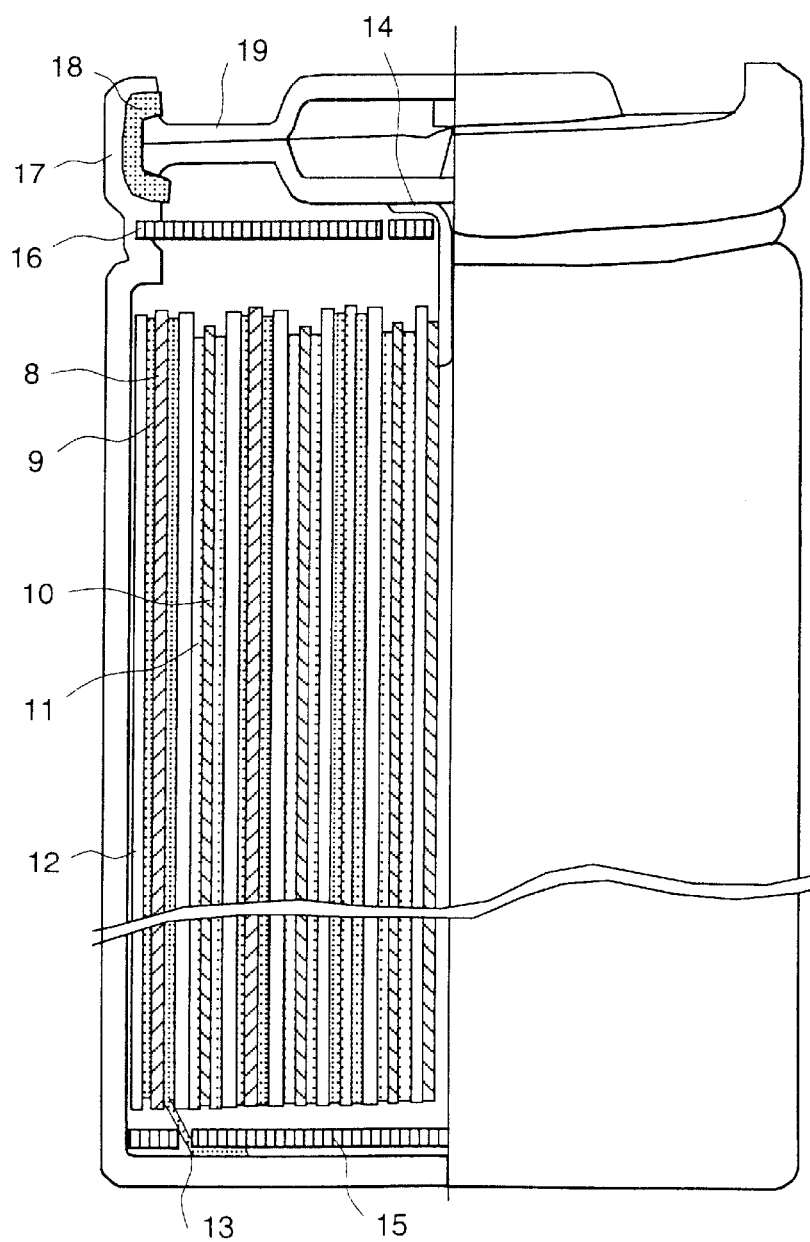
FIG. 2 is a partial cross section of a cylindrical type lithium secondary battery representing an embodiment of the present invention.

In order to compare battery performance, a cylindrical type lithium secondary battery having a structure as illustrated in FIG. 2 was prepared by the following steps. Artificial graphite (mesophase micro beads) was used as a negative electrode active material; polyvinylidene fluoride (PVDF) was used as a binding agent; these materials were mixed in a ratio of artificial graphite: PVDF=91:9; the mixture was dissolved into a solvent, N-methylpyrolidone (hereinafter, called as NMP); and a paste was obtained by kneading the mixture. The paste was applied onto both side planes of a copper foil, which was used as a negative electrode electric collector 8, and the negative electrode was obtained by forming negative poles 9 at both sides of the negative electrode electric collector 8 by drying, heating, pressing, and vacuum drying the applied paste. Lithium cobaltate was used as the positive electrode active material; graphite carbon was used as a conductive agent; PVDF was used as a binding agent; these materials were mixed in a ratio of lithium cobaltate: graphite carbon: PVDF=85:7:8; the mixture was dissolved into NMP, a solvent; and a paste of positive electrode material was obtained by kneading the mixture. The paste was applied onto both side planes of an aluminum foil, which was used as a positive electrode electric collector 10, and the positive electrode was obtained by forming the positive electrode layer 11 at both sides of the positive electrode electric collector 10 by drying, heating, pressing, and vacuum drying the applied paste. Each of the negative electrode lead 13 and the positive electrode lead 14, which were made of nickel foil, was fixed onto non-applied portion of the negative electrode and the positive electrode, respectively, by electric welding. These leads were wound via a separator 12, and the outermost separator was fixed by tape to form an electrodes group.

The electrodes group was inserted into an outer container 17, which was made of stainless steel, so that the negative electrode 13 was placed at the bottom of the container 17 via an insulator 15 made of polypropylene for insulation. The negative electrode lead 13 was fixed to the outer container 17 at its bottom by electric welding to form a negative electrode circuit. The positive electrode lead 14 was welded electrically to the positive electrode cap 19 via a positive electrode insulator 16.

The cylindrical type lithium secondary battery G provided to the comparative example 7 was manufactured by injecting approximately 4 ml of the electrolyte A (EC:DMC=33:67, $LiPF_6$=1 M) of the comparative example 1 into the negative electrode outer container 17 through an opening, and caulking mechanically the positive electrode cap 19 onto the negative electrode outer container 17.

Using the battery G, the discharge capacity at 0° C. was measured. The charging condition was produced by a constant current-constant voltage system, the constant current was 1.6 A, the constant voltage was set at 4.2 V, and the charge terminating condition was 20 mA. The discharge condition was set as a constant current discharge of 1.6 A. The discharge capacity of the battery G evaluated under the above condition was 1218 mAh.

Embodiment 42

The battery 42 of the embodiment 42 was manufactured by the same method as the comparative example 7 using the electrolyte 1 prepared in the embodiment 1 (EC:DMC:EOFPA ($HCF_2(CF_2)_3$ COOEt)=32:63:5 by volume %, $LiPF_6$=1 M). The discharge capacity at 0° C. of the battery 42 was 1230 mAh. This value was larger than the value of the battery G of the comparative example 7, the electrolyte of which did not contain fluorinated solvent having unsymmetrical fluorinated alkyl at the terminal end, by 12 mAh, and the advantage of mixing the fluorinated solvent relating to the chemical structure of the present invention was indicated.

Embodiment 43

The battery 43 of the embodiment 43 was manufactured by the same method as the comparative example 7 using the electrolyte 2 prepared in the embodiment 2 (EC:DMC:IOFP ($HCF_2(CF_2)_3CH_2I$)=32:63:5 by volume %, $LiPF_6$=1 M). The discharge capacity at 0° C. of the battery 43 was 1235 mAh. This value was larger than the value of the battery G of the comparative example 7 by 17 mAh, and a similar advantage to that of the embodiment 42 was confirmed with the halogenized alkane.

Embodiment 44

The battery 44 of the embodiment 44 was manufactured by the same method as the comparative example 7 using the electrolyte 3 prepared in the embodiment 3 (EC:DMC:TFHFO ($FC(CF_3)_2(CF_2)_4(CF_3)_2CF$)=32:63:5 by volume %, $LiPF_6$=1 M). The discharge capacity at 0° C. of the battery 44 was 1238 mAh. This value was larger than the value of the battery G of the comparative example 7 by 20 mAh, and the effect to improve load performance at a low temperature was confirmed with the perfluorinated alkane having no functional group.

In accordance with the above embodiments 42–43, it was revealed that the discharge capacity at a low temperature could be improved by mixing a fluorinated solvent having a structure in which the terminal end of the fluorinated alkyl group was unsymmetrical with the electrolyte as a solvent. The advantage can be deemed as an effect of increasing the diffusivity of lithium ions caused by mixing the fluorinated solvent having chemical structures defined by the present invention indicated in the embodiments 1–3 (further embodiments 4–15).

Embodiment 45

The battery 45 of the embodiment 45 was manufactured by the same method as the comparative example 7 using the electrolyte 4 prepared in the embodiment 4 (EC:DMC:FPME ($H(CF_2)_2OCH_3$)=32:63:5 by volume %, $LiPF_6$=1 M). The discharge capacity at 0° C. of the battery 45 was 1245 mAh. This value was larger than the value of the battery G of the comparative example 7 by 28 mAh, and larger by 15 mAh, 10 mAh, and 7 mAh respectively in comparison with each of the above embodiments 42–44. It was revealed that the discharge capacity at a low temperature could be improved further by using the fluorinated solvent having an ether structure as FPME.

Embodiment 46

The battery 46 of the embodiment 46 was manufactured by the same method as the comparative example 7 using the electrolyte 5 prepared in the embodiment 5 (EC:DMC:HFPME (CF$_3$CHFCF$_2$OCH$_3$)=32:63:5 by volume %, LiPF$_6$=1 M). The discharge capacity at 0° C. of the battery 46 was 1270 mAh. This value was larger than the value of the battery G of the comparative example 7 by 52 mAh, and larger than the value of the embodiment 45 by 15 mAh. It was revealed that the discharge capacity at a low temperature could be improved further by using the compound having an unsymmetrical fluorinated terminal end and a CF$_3$ group such as HFPME.

Embodiment 47

The battery 47 of the embodiment 47 was manufactured by the same method as the comparative example 7 using the electrolyte 6 prepared in the embodiment 6 (EC:DMC:HFEI (FC(CF$_3$)$_2$CF$_2$OCH$_3$)=32:63:5 by volume %, LiPF$_6$=1 M). The discharge capacity at 0° C. of the battery 47 was 1280 mAh. This value was larger than the value of the battery G of the comparative example 7 by 62 mAh, and larger than the value of the embodiment 46 by 10 mAh.

Embodiment 48

The battery 48 of the embodiment 48 was manufactured by the same method as the comparative example 7 using the electrolyte 7 prepared in the embodiment 7 using HFE1, which was obtained by mixing HFEI with HFEN (CF$_3$(CF$_2$)$_3$OCH$_3$) in a ratio of HFEI:HFEN=80:20 by volume, (EC:DMC:HFE1=32:63:5 by volume %, LiPF$_6$=1 M). The discharge capacity at 0° C. of the battery 48 was 1280 mAh. This value was larger than the value of the battery G of the comparative example 7 by 82 mAh, and larger than the value of the embodiment 47 by 20 mAh.

As explained above, the discharge capacity at a low temperature can be improved further by using a mixture of fluorinated ether having a linear chain structure at the terminal end of fluorinated alkane with fluorinated ether having a branched chain structure at the terminal end of fluorinated alkane.

Embodiment 49

The battery 49 of the embodiment 49 was manufactured by the same method as the comparative example 7 using the electrolyte 8 prepared in the embodiment 8 using HFE2, which was obtained by mixing HFEI with HFEN in a ratio of HFEI:HFEN=60:40 by volume, (EC:DMC:HFE2=32:63:5 by volume %, LiPF$_6$=1 M). The discharge capacity at 0° C. of the battery 49 was 1330 mAh. This value was larger than the value of the battery G of the comparative example 7 by 112 mAh, and larger than the value of the embodiment 48 by 30 mAh.

As explained above, the discharge capacity at a low temperature can be improved further by adjusting the mixing ratio of the mixture of fluorinated ether having a linear chain structure at the terminal end of the fluorinated alkane with fluorinated ether having a branched chain structure at the terminal end of the fluorinated alkane.

Embodiment 50

The battery 50 of the embodiment 50 was manufactured by the same method as the comparative example 7 using the electrolyte 9 prepared in the embodiment 9 using HFE3, which was obtained by mixing HFEI with HFEN in a ratio of HFEI:HFEN=40:60 by volume, (EC:DMC:HFE3=32:63:5 by volume %, LiPF$_6$=1 M). The discharge capacity at 0° C. of the battery 50 was 1320 mAh. This value was larger than the value of the battery G of the comparative example 7 by 102 mAh.

Embodiment 51

The battery 51 of the embodiment 51 was manufactured by the same method as the comparative example 7 using the electrolyte 10 prepared in the embodiment 10 using HFE2, which was obtained by mixing HFEI with HFEN in a ratio of HFEI:HFEN=60:40 by volume, (EC:DMC:HFE2=30:60:10 by volume %, LiPF$_6$=1 M). The discharge capacity at 0° C. of the battery 51 was 1350 mAh. This value was larger than the value of the battery G of the comparative example 7 by 132 mAh, and further larger than the values of the embodiments 47–50 by 70 mAh, 50 mAh, 20 mAh, 30 mAh, respectively. The discharge capacity at a low temperature was improved further by adjusting the mixing amount of the fluorinated solvent into the electrolyte.

Embodiment 52

The battery 52 of the embodiment 52 was manufactured by the same method as the comparative example 7 using the electrolyte 11 prepared in the embodiment 11 using HFE2, which was obtained by mixing HFEI with HFEN in a ratio of HFEI:HFEN=60:40 by volume, (EC:DMC:HFE2=20:60:20 by volume %, LiPF$_6$=1 M). The discharge capacity at 0° C. of the battery 52 was 1330 mAh. This value was larger than the value of the battery G of the comparative example 7 by 112 mAh.

Embodiment 53

The battery 53 of the embodiment 53 was manufactured by the same method as the comparative example 7 using the electrolyte 12 prepared in the embodiment 12 using HFE2, which was obtained by mixing HFEI with HFEN in a ratio of HFEI:HFEN=60:40 by volume, (EC:DMC:HFE2=10:60:30 by volume %, LiPF$_6$=1 M). The discharge capacity at 0° C. of the battery 53 was 1310 mAh. This value was larger than the value of the battery G of the comparative example 7 by 92 mAh.

Embodiment 54

The battery 54 of the embodiment 54 was manufactured by the same method as the comparative example 7 using the electrolyte 13 prepared in the embodiment 13 using HFE2, which was obtained by mixing HFEI with HFEN in a ratio of HFEI:HFEN=60:40 by volume, (EC:DMC:HFE2=10:50:40 by volume %, LiPF$_6$=1 M). The discharge capacity at 0° C. of the battery 52 was 1305 mAh. This value was larger than the value of the battery G of the comparative example 7 by 87 mAh.

In accordance with the above embodiments 50–54, the discharge capacity at a low temperature is improved further by adjusting the mixing amount of HFE in the electrolyte. In case of HFE, the performance increasing effect is significant when the mixing amount of HFE in the electrolyte in the range of approximately 5–20% by volume.

Embodiment 55

The electrolyte 55 was prepared by mixing dimethylvinylene carbonate (hereinafter, called as DMVC) with the electrolyte 8 by 2% by weight, and the battery 55 of the embodiment 55 was manufactured by the same method as the comparative example 7 using the electrolyte 55. The discharge capacity at 0° C. of the battery 52 was 1360 mAh. This value was larger than the value of the battery G of the comparative example 7 by 142 mAh, and larger than any of the batteries of the embodiments 42–54.

As explained above, the discharge capacity at a low temperature is remarkably improved by adding a solvent containing double bond in addition to the fluorinated solvent.

Embodiment 56

The electrolyte 56 was prepared by mixing vinylene carbonate (hereinafter, called as VC) with the electrolyte 8 by 2% by weight, and the battery 56 of the embodiment 56 was manufactured by the same method as the comparative example 7 using the electrolyte 56. The discharge capacity at 0° C. of the battery 56 was 1365 mAh. This value was larger than the value of the battery G of the comparative example 7 by 147 mAh, and larger further than the value of the battery 55 of the embodiment 55 by 5 mAh.

Embodiment 57

The electrolyte 57 was prepared by mixing chloroethylene carbonate (hereinafter, called as C1EC) with the electrolyte 8 by 2% by weight, and the battery 57 of the embodiment 57 was manufactured by the same method as the comparative example 7 using the electrolyte 57. The discharge capacity at 0° C. of the battery 57 was 1368 mAh. This value was larger than the value of the battery G of the comparative example 7 by 150 mAh, and larger further than the value of the battery 56 of the embodiment 56 by 3 mAh.

As explained above, it was revealed that the discharge capacity at a low temperature was further improved by adding the fluorinated solvent into the electrolyte, even if a solvent, the reactivity of which with the negative electrode material was high at initial charge, was used.

Embodiment 58

The electrolyte 58 was prepared by mixing ethylene sulfite (hereinafter, called as ES) with the electrolyte 8 by 2% by weight, and the battery 58 of the embodiment 58 was manufactured by the same method as the comparative example 7 using the electrolyte 58. The discharge capacity at 0° C. of the battery 58 was 1375 mAh. This value was larger than the value of the battery G of the comparative example 7 by 157 mAh, and even larger than the value of the battery 57 of the embodiment 57 by 7 mAh.

Embodiment 59

The electrolyte 59 was prepared by mixing dimethyl sulfite (hereinafter, called as DMS) with the electrolyte 8 by 2% by weight, and the battery 59 of the embodiment 59 was manufactured by the same method as the comparative example 7 using the electrolyte 59. The discharge capacity at 0° C. of the battery 59 was 1380 mAh. This value was larger than the value of the battery G of the comparative example 7 by 162 mAh, and larger further than the value of the battery 58 of the embodiment 58 by 5 mAh.

As explained above, the discharge capacity at a low temperature of the battery using the electrolyte mixed with fluorinated solvent can be increased further by sulfur group material. The reason for this is that an ion permeable film formed on the surface of the negative electrode during the charging operation by the materials used in the embodiments 55–59 has an effect to enhance the lithium ion diffusivity at the surface boundary of the electrode in the electrolyte mixed with the fluorinated solvent.

Figure 3:
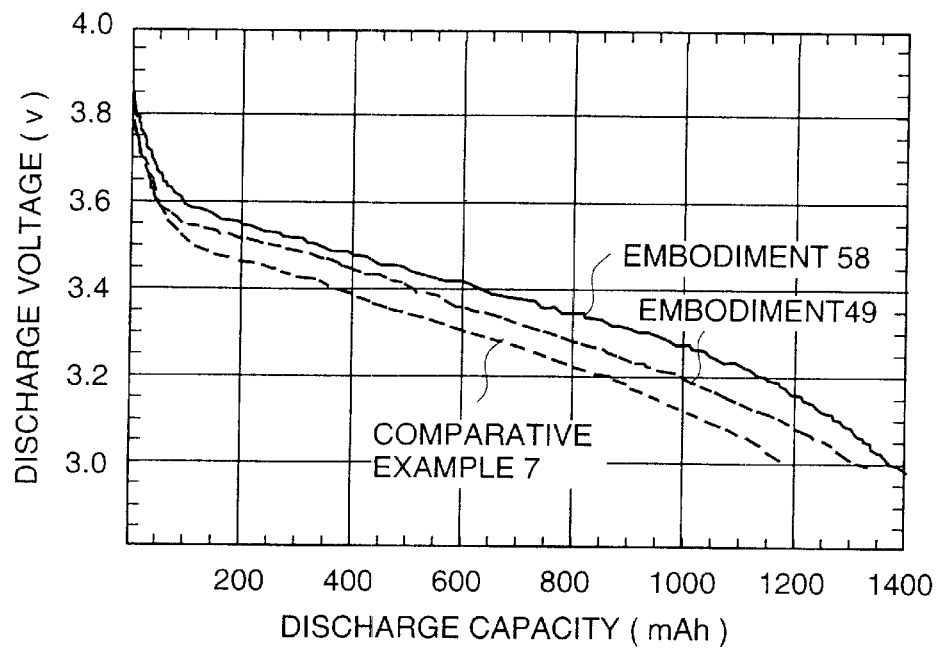
FIG. 3 is a graph indicating battery performance by discharge voltage profile at 0° C. of an embodiment of the present invention.
Figure 4:
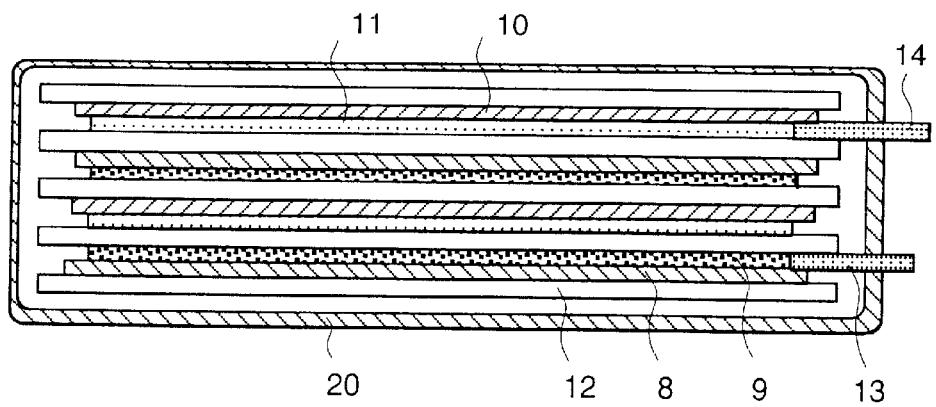
FIG. 4 is a cross section of a polymer secondary battery representing an embodiment of the present invention.

The discharge capacity-discharge voltage profile of 1600 mA constant current discharge in a 0° C. atmosphere of the comparative example 7, embodiment 49, and embodiment 58 are indicated in FIG. 3. In accordance with FIG. 3, the battery using the electrolyte mixed with the fluorinated solvent of the present invention (embodiment 49) and the battery using the electrolyte mixed with the.solvent which forms a coating film on the negative electrode (embodiment 58) have a higher discharge voltage in comparison with the comparative example (comparative example 7), and a significant improvement in performance in the power capacity and power can be observed.

Polymer Secondary Battery

COMPARATIVE EXAMPLE 8

Artificial graphite (mesophase micro beads) was used as a negative electrode active material; PVDF was used as a binding agent; these materials were mixed in a ratio of artificial graphite: PVDF=91:9; the mixture was dissolved into a solvent (NMP); and a paste was obtained by kneading the mixture. The paste was applied onto both sides of a copper foil, which was used as a negative electrode electric collector 8, and the negative electrode was obtained by forming negative poles 9 at both sides of the negative electrode electric collector 8 by drying, heating, pressing, and vacuum drying the applied paste. In accordance with the present battery, the electrode is folded when the battery is formed. Therefore, the folded portions remained partially as non-applied portions, and also portions where the leads for leading terminals out connected were remained as the non-applied portions. Lithium cobaltate was used as the positive electrode active material; graphite carbon was used as a conductive agent; PVDF was used as a binding agent; these materials were mixed in a ratio of lithium cobaltate: graphite carbon: PVDF=85:7:8; the mixture was dissolved into a solvent (NMP); and a paste of positive electrode material was obtained by kneading the mixture. The paste was applied onto both sides of an aluminum foil, which was used as a positive electrode electric collector 10, and the positive electrode was obtained by forming the positive electrode layer 11 at both sides of the positive electrode electric collector 10 by drying, heating, pressing, and vacuum drying the applied paste. The non-applied portions remained on the positive electrode in the same way as the negative electrode. The polymer electrolyte E (LiTFSI of 1.5 M was dissolved as a lithium salt into a mixture of EC:DMC:PVDF= 20:50:30) of the comparative example E was impregnated into a micro-porous film made of polyethylene used as a separator in a heated and fused condition to form an electrolyte layer. The electrolyte layer was interposed between the negative electrode, which was connected with the negative electrode lead 13 by electric welding, and the positive electrode, which was connected with the positive electrode lead 14 by electric welding, and an electrodes group was formed by folding the electrodes at the non-applied portions and laminating. The electrodes group was inserted into an outer container 20, which was made of polypropylene cladded with fused aluminum, so that a part of the leads of both the positive electrode and the negative electrode were withdrawn outside, and a polymer secondary battery of the comparative example 8 was manufactured by sealing the lead terminal side by thermo-compression bonding.

Using the polymer secondary battery 8, the discharge capacity at 0° C. was measured. The charging condition was effected by a constant current-constant voltage system, the constant current was 0.2 A, the constant voltage was set at 4.2 V, and the charge terminating condition was 10 mA. The discharge condition was set as a constant current discharge of 0.4 A. The discharge capacity of the polymer secondary battery 8 evaluated under the above condition was 280 mAh.

Embodiment 60

The polymer secondary battery 60 of the embodiment 60 was manufactured by the same method as the comparative example 8 using the polymer electrolyte 25 prepared in the embodiment 25 ( LiTFSI=1.5 M was dissolved into a mixture of EC:DMC:EOFPA(HCF$_2$(CF$_2$)$_3$ COOEt):PVDF= 20:45:5:30). The discharge capacity at 0° C. of the battery 60 was 310 mAh. This value was larger than the value of the polymer secondary battery 8 of the comparative example 8 by 30 mAh, and the advantage in improvement of discharge performance at a low temperature by mixing the fluorinated solvent having fluorinated alkyl chain, terminal structure of which was unsymmetrical, into the electrolyte was recognized.

Embodiment 61

The polymer secondary battery 61 of the embodiment 61 was manufactured by the same method as the comparative example 8 using the polymer electrolyte 26 prepared in the embodiment 26 (LiTFSI=1.5 M was dissolved into a mixture of EC:DMC:IOFP (HCF$_2$(CF$_2$)$_3$CH$_2$I):PVDF=20:45:5:30) as the polymer electrolyte. The discharge capacity at 0° C. of the battery 61 was 312 mAh. This value was larger than the value of the polymer battery 8 of the comparative example 8 by 32 mAh.

Embodiment 62

The polymer secondary battery 62 of the embodiment 62 was manufactured by the same method as the comparative example 8 using the polymer electrolyte 27 prepared in the embodiment 27 (LiTFSI=1.5 M was dissolved into a mixture of EC:DMC:TFHFO:PVDF=20:45:5:30)as the polymer electrolyte. The discharge capacity at 0° C. of the battery 62 was 315 mAh. This discharge capacity was larger than the value of the polymer battery 8 of the comparative example 8 by 35 mAh. As indicated in the above embodiment 61 and 62, the effect to increase the discharge capacity at a low temperature was confirmed, even if the kind of fluorinated solvent was changed.

Embodiment 63

The polymer secondary battery 63 of the embodiment 63 was manufactured by the same method as the comparative example 8 using the polymer electrolyte 28 prepared in the embodiment 28 (LiTFSI=1.5 M was dissolved into a mixture of EC:DMC:TFHFO:PVDF=20:45:5:30)as the polymer electrolyte. The discharge capacity at 0° C. of the battery 63 was 320 mAh. This discharge capacity was larger than the value of the polymer battery 8 of the comparative example 8 by 40 mAh. In comparison with the batteries of the embodiments 60–62, the discharge capacity of the battery 63 is larger by 10 mAh, 8 mAh, and 5 mAh, respectively. The discharge capacity at a low temperature can be increased by making the fluorinated solvent have an ether structure.

Embodiment 64

The polymer secondary battery 64 of the embodiment 64 was manufactured by the same method as the comparative example 8 using the polymer electrolyte 29 prepared in the embodiment 29 (LiTFSI=1.5 M was dissolved into a mixture of EC:DMC:HFPME:PVDF=20:45:5:30 as the polymer electrolyte. The discharge capacity at 0° C. of the battery 63 was 330 mAh. This discharge capacity was larger than the value of the polymer battery 8 of the comparative example 8 by 50 mAh. In comparison with the battery of the embodiment 63, the discharge capacity of the battery 64 was larger by 10 mAh, and the discharge capacity at a low temperature can be increased further by making the fluorinated solvent have a structure having a CF$_3$ group at the terminal end of the fluorinated alkyl chain.

Embodiment 65

The polymer secondary battery 65 of the embodiment 65 was manufactured by the same method as the comparative example 8 using the polymer electrolyte 30 prepared in the embodiment 30 (LiTFSI=1.5 M was dissolved into a mixture of EC:DMC:HFEI:PVDF=20:45:5:30 as the polymer electrolyte. The discharge capacity at 0° C. of the battery 64 was 340 mAh. This discharge capacity was larger than the value of the polymer battery 8 of the comparative example 8 by 60 mAh. In comparison with the battery of the embodiment 64, the discharge capacity of the battery 65 was larger by 10 mAh, and the discharge capacity at a low temperature can be increased further by making the fluorine chain.of fluorinated alkyl ether having CF$_3$ group at the terminal end perfluorinated.

Embodiment 66

The polymer secondary battery 66 of the embodiment 66 was manufactured by the same method as the comparative example 8 using the polymer electrolyte 31 prepared in the embodiment 31 (using HFE2 which is obtained by mixing HFEI and HFEN (CF$_3$(CF$_2$)$_3$OCH$_3$) in a ratio of HFEI:HFEN=60:40 as a fluorinated solvent, and LiTFSI of 1.5 M was dissolved into a mixture of EC:DMC:HFE2:PVDF=15:50:5:30) as the polymer electrolyte. The discharge capacity at 0° C. of the battery 66 was 346 mAh. This discharge capacity was larger than the value of the polymer battery 8 of the comparative example 8 by 66 mAh. In comparison with the battery of the embodiment 65, the discharge capacity of the battery 66 was larger by 6 mAh, and the discharge capacity at a low temperature can be increased further by using a mixture of fluorinated ether having a branched chain structure with fluorinated ether having a linear chain structure.

Embodiment 67

The polymer secondary battery 67 of the embodiment 67 was manufactured by the same method as the comparative example 8 using the polymer electrolyte 32 prepared in the embodiment 32 ( using HFE2 which is obtained by mixing HFEI and HFEN (CF$_3$(CF$_2$)$_3$OCH$_3$) in a ratio of HFEI:HFEN=60:40 as a fluorinated solvent, and LiTFSI of 1.5 M was dissolved into a mixture of EC:DMC:HFE2:PVDF=15:45:10:30) as the polymer electrolyte. The discharge capacity at 0° C. of the battery 67 was 350 mAh. This discharge capacity was larger than the value of the polymer battery 8 of the comparative example 8 by 70 mAh. In comparison with the battery of the embodiment 66, the discharge capacity of the battery 67 was larger by 4 mAh, and the discharge capacity at a low temperature can be increased further by adjusting the mixing ratio of the fluorinated ether in the electrolyte.

Embodiment 68

The polymer secondary battery 68 of the embodiment 68 was manufactured by the same method as the comparative example 8 using the polymer electrolyte 33 prepared in the embodiment 33 (using HFE2 which is obtained by mixing HFEI and HFEN ($CF_3(CF_2)_3OCH_3$) in a ratio of HFEI:HFEN=60:40 as a fluorinated solvent, and LiTFSI of 1.5 M was dissolved into a mixture of EC:DMC:HFE2:PVDF=10:45:15:30) as the polymer electrolyte. The discharge capacity at 0° C. of the battery 68 was 341 mAh. This discharge capacity was larger than the value of the polymer battery 8 of the comparative example 8 by 61 mAh.

Embodiment 69

The polymer secondary battery 69 of the embodiment 69 was manufactured by the same method as the comparative example 8 using the polymer electrolyte 34 prepared in the embodiment 33 (using HFE2 which is obtained by mixing HFEI and HFEN ($CF_3(CF_2)_3OCH_3$) in a ratio of HFEI:HFEN=60:40 as a fluorinated solvent, and LiTFSI of 1.5 M was dissolved into a mixture of EC:DMC:HFE2:PVDF=10:40:20:30) as the polymer electrolyte. The discharge capacity at 0° C. of the battery 69 was 341 mAh. This discharge capacity was larger than the value of the polymer battery 8 of the comparative example 8 by 61 mAh.

Embodiment 70

The polymer secondary battery 70 of the embodiment 70 was manufactured by the same method as the comparative example 8 using the polymer electrolyte 70 prepared by mixing dimethylvinylene carbonate DMVC into the polymer electrolyte 31 of the embodiment 31 by 2% by weight as the polymer electrolyte. The discharge capacity at 0° C. of the battery 70 was 360 mAh. This discharge capacity was larger than the value of the polymer battery 8 of the comparative example 8 by 80 mAh. Further, in comparison with the battery 66, the discharge capacity is larger by 14 mAh, and the discharge capacity at a low temperature can be increased further by adding a compound having a function to form a reaction product film on the surface of the negative electrode to the polymer electrolyte mixed with the fluorinated solvent.

Embodiment 71

The polymer secondary battery 71 of the embodiment 71 was manufactured by the same method as the comparative example 8 using the polymer electrolyte 71 prepared by mixing vinylene carbonate VC into the polymer electrolyte 31 of the embodiment 31 by 2% by weight as the polymer electrolyte. The discharge capacity at 0° C. of the battery 71 was 362 mAh. This discharge capacity was larger than the value of the polymer battery 8 of the comparative example 8 by 82 mAh. Further, in comparison with the battery 66, the discharge capacity is larger by 16 mAh, and the discharge capacity at a low temperature can be increased further by adding a compound having a function to form a reaction product film on the surface of the negative electrode to the polymer electrolyte mixed with the fluorinated solvent.

Embodiment 72

The polymer secondary battery 72 of the embodiment 72 was manufactured by the same method as the comparative example 8 using the polymer electrolyte 72 prepared by mixing chloroethylene carbonate ClEC into the polymer electrolyte 31 of the embodiment 31 by 2% by weight as the polymer electrolyte. The discharge capacity at 0° C. of the battery 72 was 365 mAh. This discharge capacity was larger than the value of the polymer battery 8 of the comparative example 8 by 85 mAh. Further, in comparison with the battery 66, the discharge capacity is larger by 19 mAh, and the discharge capacity at a low temperature can be increased further by adding a compound having a function to form a reaction product film on the surface of the negative electrode to the polymer electrolyte mixed with the fluorinated solvent.

Embodiment 73

The polymer secondary battery 73 of the embodiment 73 was manufactured by the same method as the comparative example 8 using the polymer electrolyte 73 prepared by mixing ethylene sulfite ES into the polymer electrolyte 31 of the embodiment 31 by 2% by weight as the polymer electrolyte. The discharge capacity at 0° C. of the battery 73 was 367 mAh. This discharge capacity was larger than the value of the polymer battery 8 of the comparative example 8 by 87 mAh. Further, in comparison with the battery 66, the discharge capacity is larger by 21 mAh, and the discharge capacity at a low temperature can be increased further by adding a sulfur group compound having a function to form a reaction product film on the surface of the negative electrode to the polymer electrolyte mixed with the fluorinated solvent.

Embodiment 74

The polymer secondary battery 74 of the embodiment 74 was manufactured by the same method as the comparative example 8 using the polymer electrolyte 74 prepared by mixing propane sulton PS into the polymer electrolyte 31 of the embodiment 31 by 2% by weight as the polymer electrolyte. The discharge capacity at 0° C. of the battery 74 was 369 mAh. This discharge capacity was larger than the value of the polymer battery 8 of the comparative example 8 by 89 mAh. Further, in comparison with the battery 66, the discharge capacity is larger by 23 mAh, and the discharge capacity at a low temperature can be increased further by adding a sulfur group compound having a function to form a reaction product film on the surface of the negative electrode to the polymer electrolyte mixed with the fluorinated solvent.

Electrochemical Capacitor

COMPARATIVE EXAMPLE 9

A paste for the polarity electrode was obtained by mixing active carbon powder as a main component of the polarity electrode; acetylene black as a conductive assistant agent; and polytetrafluoroethylene as a binding agent; into NMP as a solvent, and kneading the mixture. The paste was applied onto both sides of an electric collector made of metallic aluminum foil, and the polarity electrode was formed subsequently by drying, heating, and pressing. After connecting a lead made of nickel to one end of the polarity electrode by electric welding, an electrode group for an electrochemical capacitor was formed by winding the polarity electrode via a separator. The electrochemical capacitor 9 of the comparative example 9 was manufactured by inserting the electrode group into a battery can; connecting respective ones of a positive electrode lead and a negative electrode lead to the terminal of the positive pole and to the terminal of the negative pole of the battery lid, respectively, by electric welding; injecting the electrolyte D (solvent; PC, salt; $(Et)_4NBF_4$ 0.6 M) prepared by the comparative example 4 into the battery can; and caulking the battery lid mechanically to the battery can via a gasket made of polypropylene. A static capacity of the capacitor was evaluated when the capacitor was discharged with a constant current of 20 A from a full charged condition at 0° C. The static capacity of the capacitor of the comparative example 9 evaluated under the above condition was 58 F.

Embodiment 75

The electrochemical capacitor 75 of the embodiment 75 was manufactured by the same method as the comparative example 9 using the electrolyte 16 prepared in the embodiment 16 (a mixture of PC:DEC:EOFPA ($HCF_2(CF_2)_3COOEt$)=85:10:5 as solvent, and salt $(Et)_4NBF_4$ of 0.6 M). The static capacity was evaluated under the same condition as the comparative example 9. The static capacity of the electrochemical capacitor 75 was 61 F. The static capacity was increased 3 F from the comparative example 9. Mixing a fluorinated solvent having a fluorinated alkyl, the terminal end of which had a typical structure, was effective for increasing the performance of the electrochemical capacitor at a low temperature.

Embodiment 76

The electrochemical capacitor 76 of the embodiment 76 was manufactured by the same method as the comparative example 9 using the electrolyte 17 prepared in the embodiment 17 (a mixture of PC:DEC:IOFP ($HCF_2(CF_2)_3CH_2I$)=85:10:5 as solvent, and salt $(Et)_4NBF_4$ of 0.6 M). The static capacity was evaluated under the same condition as the comparative example 9. The static capacity of the electrochemical capacitor 76 was 62 F. The static capacity was increased 4 F from the comparative example 9.

Embodiment 77

The electrochemical capacitor 77 of the embodiment 77 was manufactured by the same method as the comparative example 9 using the electrolyte 18 prepared in the embodiment 18 (a mixture of PC:DEC:TFHFO ($FC(CF_3)_2(CF_2)_4CF(CF_3)_2$)=85:10:5 as solvent, and salt $(Et)_4NBF_4$ of 0.6 M). The static capacity was evaluated under the same condition as the comparative example 9. The static capacity of the electrochemical capacitor 77 was 64 F. The static capacitance was increased 6 F from the comparative example 9.

As explained above, several fluorinated solvents having features at the terminal end of a fluorinated alkyl were tested, and the static capacity was increased by using any one of the solvents in comparison with the capacitor of the comparative example. That is, it can be assumed that the structure at the terminal end of the alkyl contributes to the effect.

Embodiment 78

The electrochemical capacitor 78 of the embodiment 78 was manufactured by the same method as the comparative example 9 using the electrolyte 19 prepared in the embodiment 19 (a mixture of PC:DEC:FPME ($H(CF_2)_2OCH_3$)=85:10:5 as solvent, and salt $(Et)_4NBF_4$ of 0.6 M). The static capacity was evaluated under the same condition as the comparative example 9. The static capacity of the electrochemical capacitor 78 was 66 F.

The static capacitance was increased 8 F from the comparative example 9. Furthermore, in comparison with the embodiments 75, 76, and 77, the static capacity of the electrochemical capacitor 78 was larger by 5F, 4F, and 2F, respectively.

Therefore, the static capacity at a low temperature can be increased by making the functional group of the fluorinated solvent an ether structure.

Embodiment 79

The electrochemical capacitor 79 of the embodiment 79 was manufactured by the same method as the comparative example 9 using the electrolyte 20 prepared in the embodiment 20 (a mixture of PC:DEC:HFPME ($CF_3CHFCF_2OCH_3$)=85:10:5, and salt $(Et)_4NBF_4$ of 0.6 M). The static capacity was evaluated under the same condition as the comparative example 9. The static capacity of the electrochemical capacitor 79 was 68 F.

The static capacitance was increased 10 F from the comparative example 9. Furthermore, in comparison with the embodiment 78, the static capacity of the electrochemical capacitor 79 was larger by 2F. The static capacity at a low temperature can be increased by using fluorinated ether having $CF_3$ at the terminal end of the fluorinated alkyl.

Embodiment 80

The electrochemical capacitor 80 of the embodiment 80 was manufactured by the same method as the comparative example 9 using the electrolyte 21 prepared in the embodiment 21 (a mixture of PC:DEC:HFEI ($FC(CF_3)_2CF_2OCH_3$)=85:10:5, and salt $(Et)_4NBF_4$ of 0.6 M). The static capacity was evaluated under the same condition as the comparative example 9. The static capacity of the electrochemical capacitor 80 was 71 F.

The static capacitance was increased 13 F from the comparative example 9. Furthermore, in comparison with the embodiment 79, the static capacity of the electrochemical capacitor 80 was increased by 3F. The static capacity at a low temperature can be increased further by making fluorinated ether having $CF_3$ at the terminal end of the fluorinated alkyl to perfluoroalkyl ether.

Embodiment 81

The electrochemical capacitor 81 of the embodiment 81 was manufactured by the same method as the comparative example 9 using the electrolyte 22 prepared in the embodiment 22 (the fluorinated solvent HFE 1, which was prepared by mixing HFEI and HFEN in a ratio of HFEI:HFEN ($CF_3(CF_2)_3OCH_3$)=80:20 by volume, was used. A mixture of PC:DEC:HFE1=85:10:5 by volume, and salt $(Et)_4NBF_4$ of 0.6 M). The static capacity was evaluated under the same condition as the comparative example 9. The static capacity of the electrochemical capacitor 81 was 72 F.

The static capacitance was increased 14 F from the comparative example 9. Furthermore, in comparison with the embodiment 80, the static capacity of the electrochemical capacitor 81 was increased by 1F. The static capacity at a low temperature can be increased further by using a mixture of perfluoroalkyl of branched structure having $CF_3$ at the terminal end of the fluorinated alkyl and perfluoroalkyl ether of linear chain structure having $CF_3$ at the terminal end of the fluorinated alkyl.

Embodiment 82

The electrochemical capacitor 82 of the embodiment 82 was manufactured by the same method as the comparative example 9 using the electrolyte 23 prepared in the embodiment 23. The fluorinated solvent HFE2, which was prepared by mixing HFEI and HFEN in a ratio of HFEI:HFEN ($CF_3(CF_2)_3OCH_3$)=60:40 by volume, was used. A mixture of PC:DEC:HFE2=85:10:5 by volume, and salt $(Et)_4NBF_4$ of 0.6 M was used as the electrolyte 23. The static capacity was evaluated under the same condition as the comparative example 9. The static capacity of the electrochemical capacitor 82 was 75 F.

The static capacitance was increased 17 F from the comparative example 9. Furthermore, in comparison with the embodiment 81, the static capacity of the electrochemical capacitor 82 was increased by 3F. The static capacity at a low temperature can be increased further by adjusting the mixing ratio of the mixture of perfluoroalkyl of branched structure having $CF_3$ at the terminal end of the fluorinated alkyl and perfluoroalkyl ether of linear chain structure having $CF_3$ at the terminal end of the fluorinated alkyl.

Embodiment 83

The electrochemical capacitor 83 of the embodiment 83 was manufactured by the same method as the comparative example 9 using the electrolyte 24 prepared in the embodiment 24. The fluorinated solvent HFE3, which was prepared by mixing HFEI and HFEN in a ratio of HFEI:HFEN $(CF_3(CF_2)_3OCH_3)$=40:60 by volume, was used. A mixture of PC:DEC:HFE3=85:10:5 by volume, and salt $(Et)_4NBF_4$ of 0.6 M was used as the electrolyte 24. The static capacity was evaluated under the same condition as the comparative example 9. The static capacity of the electrochemical capacitor 83 was 72 F.

The static capacitance was increased 14 F from the comparative example 9.

As explained above, the diffusivity of mobile ions in an electrolyte, or in a polymer electrolyte, can be improved by mixing any of a fluorinated solvent having a branched chain structure; branched chain fluorinated solvent alkyl ether; and a mixture of branched and linear chain fluorinated alkyl ether of the present invention, into the electrolyte, or in the polymer electrolyte. In accordance with using an electrolyte mixed with any of these fluorinated solvents, the discharge capacity or static capacity at a low temperature of a lithium primary battery, lithium secondary battery, polymer secondary battery, and electrochemical capacitor can be improved. In accordance with the improvement in the operation performance at a low temperature, application of these batteries or the capacitors to portable outdoor appliance can be extended widely, and these batteries or the capacitors can be applied preferably to installed outdoor appliance such as home power storage system and so on.

What is claimed is:

1. A non-aqueous electrolyte comprising organic solvent and lithium salt, wherein
said organic solvent comprises a fluorinated solvent expressed by the following chemical formula 1:

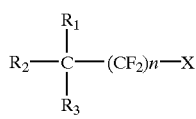

where, n indicates an integer from 1 to 10, respective of $R_1$, $R_2$, and $R_3$ indicates any one of fluorine, hydrogen, chlorine, methyl group, ethyl group, trifluoromethyl group, -or trifluoroethyl group, these elements or groups satisfy a relation of any one of $R_1 \neq R_2 \neq R_3$, $R_1 \neq R_2$, $R_2 \neq R_3$, or $R_1 \neq R_3$, and X indicates any one of ether group, ester group, acyl group, semifluoroether group, semifluoroester group, semifluoroacyl group, fluorine, chlorine, iodine, hydrogen, methyl group, ethyl group, propyl group, or amino group,
wherein the fluorinated solvent is contained in the non-aqueous electrolyte in the amount of 5–40% by volume, and
wherein the electrolyte has a diffusion coefficient of lithium ions of at least $7\times10^{-10}$ m$^2$/s.

2. A non-aqueous electrolyte claimed in claim 1, wherein said organic solvent is a fluorinated ether expressed by the following chemical formula 2:

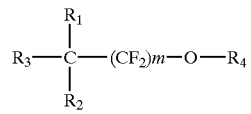

where, m indicates an integer from 1 to 10, respective of $R_1$, $R_2$, and $R_3$ indicates any one of fluorine, hydrogen, chlorine, methyl group, ethyl group, trifluoromethyl group, or trifluoroethyl group, these elements or groups satisfy a relation of any one of $R_1 \neq R_2 \neq R_3$, $R_1 \neq R_2$, $R_2 \neq R_3$, or $R_1 \neq R_3$, and $R_4$ indicates any one of methyl group, ethyl group, or propyl group.

3. A non-aqueous electrolyte claimed in claim 2, wherein said fluorinated ether is one of or both of linear chain fluorinated ether expressed by the following chemical formula

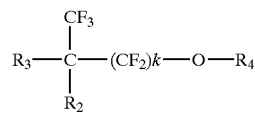

where, k indicates an integer from 1 to 10, and $R_4$ indicates any one of methyl group, ethyl group, or propyl group
and branched chain fluorinated ether expressed by the following chemical formula 4:

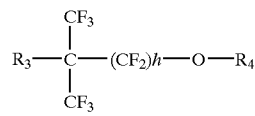

where, h indicates an integer from 1 to 10, and $R_4$ indicates any one of methyl group, ethyl group, propyl group, semifluoromethyl group, semifluoroethyl group, or semifluoropropyl group.

4. A non-aqueous electrolyte comprising organic solvent and quaternary onium salt, wherein
said organic solvent comprises a fluorinated solvent expressed by the following chemical formula 1:

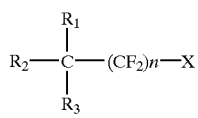

where, n indicates an integer from 1 to 10, respective of $R_1$, $R_2$, and $R_3$ indicates any one of fluorine, hydrogen, chlorine, methyl group, ethyl group, trifluoromethyl group, or trifluoroethyl group, these elements or groups satisfy a relation of any one of $R_1 \neq R_2 \neq R_3$, $R_1 \neq R_2$, $R_2 \neq R_3$, and X indicates any one of ether group, ester group, acyl group, semifluoroether group, semifluoroester group, semifluoroacyl group, fluorine, chlorine, iodine, hydrogen, methyl group, ethyl group, propyl group, or amino group, wherein the fluorinated solvent is contained in the non-aqueous electrolyte in the amount of 5–40% by volume, and wherein the electrolyte has a diffusion coefficient of lithium ions of at least $7 \times 10^{-10}$ m$^2$/s.

5. A non-aqueous electrolyte claimed in claim 4, wherein said fluorinated solvent is fluorinated ether expressed by the following chemical formula 2:

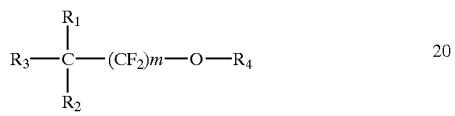

where, n indicates an integer from 1 to 10, respective of $R_1$, $R_2$, and $R_3$ indicates any one of fluorine, hydrogen, chlorine, methyl group, ethyl group, trifluoromethyl group, or trifluoroethyl group, these elements or groups satisfy a relation of any one of $R_1 \neq R_2 \neq R_3$, $R_1 \neq R_2$, $R_2 \neq R_3$, or $R_1 \neq R_3$, and $R_4$ indicates any one of methyl group, ethyl group, or propyl group.

6. A non-aqueous electrolyte claimed in claim 5, wherein said fluorinated ether is one of or both of linear chain fluorinated ether expressed by the following chemical formula 3:

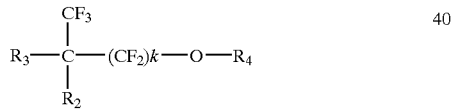

where, k indicates an integer from 1 to 10, and $R_4$ indicates any one of methyl group, ethyl group, propyl group, semifluoromethyl group, semifluoroethyl group, or semifluoropropyl group, and branched chain fluorinated ether expressed by the following chemical formula 4:

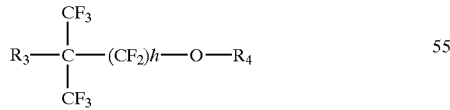

where, h indicates an integer from 1 to 10, and $R_4$ indicates any one of methyl group, ethyl group, or propyl group.

7. A polymer electrolyte comprising organic solvent, lithium salt, and polymer compound, wherein said organic solvent comprises a fluorinated solvent expressed by the following chemical formula 1:

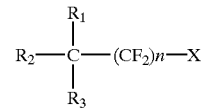

where, n indicates an integer from 1 to 10, respective of $R_1$, $R_2$, and $R_3$ indicates any one of fluorine, hydrogen, chlorine, methyl group, ethyl group, trifluoromethyl group, or trifluoroethyl group, these elements or groups satisfy a relation of any one of $R_1 \neq R_2 \neq R_3$, $R_1 \neq R_2$, $R_2 \neq R_3$, or $R_1 \neq R_3$, and X indicates any one of ether group, ester group, acyl group, semifluoroether group, semifluoroester group, semifluoroacyl group, fluorine, chlorine, iodine, hydrogen, methyl group, ethyl group, propyl group, or amino group, wherein the fluorinated solvent is contained in the non-aqueous electrolyte in the amount of 5–40% by volume, and wherein the electrolyte has a diffusion coefficient of lithium ions of at least $7 \times 10^{-10}$ m$^2$/S.

8. A polymer electrolyte claimed in claim 7, wherein said fluorinated solvent is a fluorinated ether expressed by the following chemical formula 2:

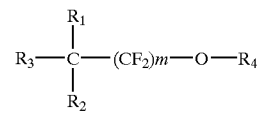

where, m indicates an integer from 1 to 10, respective of $R_1$, $R_2$, and $R_3$ indicates any one of fluorine, hydrogen, chlorine, methyl group, ethyl group, trifluoromethyl group, or trifluoroethyl group, these elements or groups satisfy a relation of any one of $R_1 \neq R_2 \neq R_3$, $R_1 \neq R_2$, $R_2 \neq R_3$, or $R_1 \neq R_3$, and $R_4$ indicates any one of methyl group, ethyl group, or propyl group.

9. A polymer electrolyte claimed in claim 8, wherein said fluorinated ether is one of or both of linear chain fluorinated ether expressed by the following chemical formula 3:

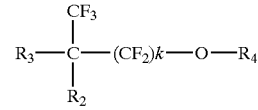

where, k indicates an integer from 1 to 10, and $R_4$ indicates any one of methyl group, ethyl group, or propyl group, and branched chain fluorinated ether expressed by the following chemical formula 4:

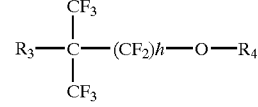

where, h indicates an integer from 1 to 10, and $R_4$ indicates any one of methyl group, ethyl group, or propyl group.

10. A lithium primary battery comprising a negative electrode made of lithium metal or a lithium alloy, a positive electrode made of manganese dioxide, and non-aqueous electrolyte, wherein said non-aqueous electrolyte is composed of the non-aqueous electrolyte claimed in any one of claims 1 to 3.

11. A lithium:secondary battery comprising a negative electrode which can intercalate and de-intercalate lithium, a positive electrode which can intercalate and de-intercalate lithium, and non-aqueous electrolyte, wherein said non-aqueous electrolyte is composed of the non-aqueous electrolyte claimed in any one of claims 1 to 3.

12. A polymer secondary battery comprising a negative electrode which can intercalate and de-intercalate lithium, a positive electrode which can intercalate and de-intercalate lithium, and polymer electrolyte, wherein said polymer electrolyte is composed of the polymer electrolyte claimed in any one of claims 7 to 10.

* * * * *